United States Patent
Yu et al.

(10) Patent No.: US 9,344,841 B2
(45) Date of Patent: May 17, 2016

(54) MOBILE DEVICE AND SERVER EXCHANGING INFORMATION WITH MOBILE APPARATUS

(75) Inventors: Seung-dong Yu, Osan-si (KR);
Woo-young Chang, Yongin-si (KR);
Se-jun Park, Yongin-si (KR);
Min-jeong Moon, Seongnam-si (KR);
Ju-yun Sung, Yongin-si (KR);
Hee-jeong Choo, Anyang-si (KR);
Sang-woong Hwang, Yongin-si (KR);
Jee-sun Yoon, Seoul (KR); Ji-young Kwahk, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 323 days.

(21) Appl. No.: 12/862,317

(22) Filed: Aug. 24, 2010

(65) Prior Publication Data

US 2011/0105152 A1 May 5, 2011

(30) Foreign Application Priority Data

Oct. 30, 2009 (KR) .................. 10-2009-0104431
Aug. 24, 2010 (KR) .................. 10-2009-0078252

(51) Int. Cl.
*H04W 24/00* (2009.01)
*H04W 4/02* (2009.01)
*H04W 4/20* (2009.01)
*H04W 4/18* (2009.01)

(52) U.S. Cl.
CPC ............ *H04W 4/02* (2013.01); *H04W 4/023* (2013.01); *H04W 4/026* (2013.01); *H04W 4/18* (2013.01); *H04W 4/206* (2013.01)

(58) Field of Classification Search
CPC ......... H04W 4/02; H04W 4/18; H04W 4/026; H04W 4/206; H04W 4/023; G06T 19/006; G03H 2001/2284; G03H 2227/02
See application file for complete search history.

(56) References Cited

U.S. PATENT DOCUMENTS

| 6,346,980 B1 | 2/2002 | Tani et al. |
| 6,546,336 B1 | 4/2003 | Matsuoka et al. |
| 6,604,049 B2 | 8/2003 | Yokota |
| 6,795,715 B1 * | 9/2004 | Kubo et al. ................ 455/556.1 |
| 8,311,526 B2 * | 11/2012 | Forstall et al. ............. 455/414.3 |
| 2002/0045988 A1 | 4/2002 | Yokota |

(Continued)

FOREIGN PATENT DOCUMENTS

| CN | 1880918 | 12/2006 |
| CN | 101164253 | 4/2008 |

(Continued)

OTHER PUBLICATIONS

Pieter-Paulus Vertongen, Dan Witzner Hansen, "Location-based Services using Image Search", Jan. 9, 2008, IEEE Workshop on Applications of Computer Vision, WACV.*

(Continued)

*Primary Examiner* — Khalid Shaheed
(74) *Attorney, Agent, or Firm* — The Farrell Law Firm, P.C.

(57) ABSTRACT

A mobile device and a server are provided. The mobile device displays relevant information extracted based on location information and additional information. Accordingly, by linking regional information acquired through a personal device with a location based service, the user is provided with useful contents effectively and further is provided with a new experience.

11 Claims, 24 Drawing Sheets

(56) References Cited

U.S. PATENT DOCUMENTS

| | | | |
|---|---|---|---|
| 2007/0186007 A1* | 8/2007 | Field et al. | 709/233 |
| 2008/0171558 A1 | 7/2008 | Choi et al. | |
| 2009/0214082 A1* | 8/2009 | Hoshi | 382/106 |
| 2009/0318168 A1* | 12/2009 | Khosravy et al. | 455/456.3 |
| 2010/0241344 A1 | 9/2010 | Nagase et al. | |
| 2011/0010674 A1* | 1/2011 | Knize et al. | 715/849 |
| 2011/0066682 A1* | 3/2011 | Aldunate et al. | 709/204 |

FOREIGN PATENT DOCUMENTS

| | | |
|---|---|---|
| JP | 9-138137 | 5/1997 |
| JP | 2000-097722 | 4/2000 |
| JP | 2001-091253 | 4/2001 |
| JP | 2002-108873 | 4/2002 |
| JP | 2004-102416 | 4/2004 |
| JP | 2006-023161 | 1/2006 |
| JP | 2006-145408 | 6/2006 |
| JP | 2008-021030 | 1/2008 |
| KR | 1020060134593 | 12/2006 |
| KR | 1020070046401 | 5/2007 |
| KR | 1020090051757 | 5/2009 |
| KR | 1020090069671 | 7/2009 |
| KR | 1020090073667 | 7/2009 |
| WO | WO 2008/076526 | 6/2008 |
| WO | WO 2009/084786 | 7/2009 |

OTHER PUBLICATIONS

Chinese Office Action dated Aug. 4, 2014 issued in counterpart Appln. No. 201080038056.6.
Japanese Office Action dated Sep. 2, 2014 issued in counterpart Appln. No. 2012-526643.
Japanese Office Action dated Jul. 6, 2015 issued in counterpart Appln. No. 2012-526643, 4 pages.
Korean Office Action dated Jul. 21, 2015 issued in counterpart Appln. No. 10-2009-0078252, 8 pages.
Chinese Office Action dated Feb. 15, 2015 issued in counterpart Appln. No. 201080038056.6.

\* cited by examiner

MOBILE DEVICE AND SERVER EXCHANGING INFORMATION WITH MOBILE APPARATUS

PRIORITY

This application claims priority under 35 U.S.C. §119 (a) to Korean Patent Application Nos. 2009-0078252 filed on Aug. 24, 2009 and 2009-0104431 filed on Oct. 30, 2009, in the Korean Intellectual Property Office, the entire contents of which are incorporated herein by reference.

BACKGROUND OF THE INVENTION

1. Field of the Invention

The present invention relates generally to a mobile device and a server exchanging information with the mobile device, and a method for providing information at the server, and more particularly, to a mobile device that links regional information acquired through a personal device with a location-based service, and a server exchanging information with the mobile device, thereby effectively providing useful contents to a user.

2. Description of the Related Art

A mobile device can provide a Location Based Service (LBS), which utilizes location information, to a user of the mobile device. The LBS may use a wireless positioning technology, a wired/wireless mobile communication network, a U-sensor network, and a platform, so that the mobile terminal can provide diverse applications under a ubiquitous environment.

Also, when the user travels to a new location, the user may use a navigation service to acquire location information of surroundings or geographical information. However, the search function of the navigation service is limited to only a function of searching for a destination having a name that is already known to the user. Therefore, the user of the navigation service is not able use the navigation service to identify the building in front of the user and the location of the user.

The user may wish to know what buildings the user is looking at. Accordingly, there is a need for a method that provides information about buildings or places a user is looking at.

SUMMARY OF THE INVENTION

The present invention has been made to address at least the above problems and/or disadvantages and to provide at least the advantages described below. Accordingly, an aspect of the present invention provides a method for linking regional information acquired through a personal device with a location based service, thereby providing useful contents to a user effectively, and also, providing a new experience to the user.

Also, another aspect of the present invention provides a mobile device that extracts at least one building from a captured image, calculates a location of the extracted building, extracts information of the building existing in the calculated location based on map information, and displays the extracted information of the building along with the captured image.

According to an aspect of the present invention, a mobile device is provided. The mobile device includes a location information acquiring unit for acquiring location information indicating a location of the mobile device, an additional information acquiring unit for receiving an input of additional information relating to the location of the mobile device, and a control unit for controlling relevant information, which is extracted based on the location information and the additional information, to be displayed.

The mobile device may further include a communication unit for performing a communication with respect to a server, a signal processing unit for processing a signal exchanged through the communication unit, and an image processing unit for displaying an image based on the signal processed by the signal processing unit, and the control unit may control the communication unit to transmit the location information and the additional information to the server, and to receive the relevant information acquired based on the location information and the additional information from the server, and may control the signal processing unit to process and output the received relevant information. The mobile device may further include a communication unit communicably connected to an external server, and, if the map information does not exist in the internal storage medium, the control unit may control the communication unit to transmit the coordinate information, the direction information, the distance information to the external server and to receive information of the building from the external server.

According to another aspect of the present invention, a server for exchanging information with a mobile device is provided. The server includes a communication unit for communicating with the mobile device, a storage unit for storing the information, and a control unit for, upon receiving location information of the mobile device and additional information relating to a location of the mobile device from the mobile device through the communication unit, searching for relevant information acquired based on the location information and the additional information with reference to the storage unit, and for controlling the communication unit to transmit the searched relevant information to the mobile device.

According to another aspect of the present invention, a method for displaying location information in a mobile device is provided. The method includes acquiring location information indicating a location of the mobile device; receiving an input of additional information relating to the location of the mobile device; extracting relevant information based on the location information and the additional information; and displaying the relevant information.

According to another aspect of the present invention, a method, performed in a server, for providing information to a mobile device is provided. The method includes receiving, from the mobile device, location information of the mobile device and additional information relating to a location of the mobile device; storing the received location information additional information; searching for relevant information acquired based on the location information and the additional information with reference to the storage unit; and transmitting the searched relevant information to the mobile device.

BRIEF DESCRIPTION OF THE DRAWINGS

The above and/or other aspects of the present invention will become more apparent and more readily appreciated from the following description of embodiments thereof, with reference to the accompanying drawings, in which.

DETAILED DESCRIPTION OF EMBODIMENTS OF THE INVENTION

Figure 1:
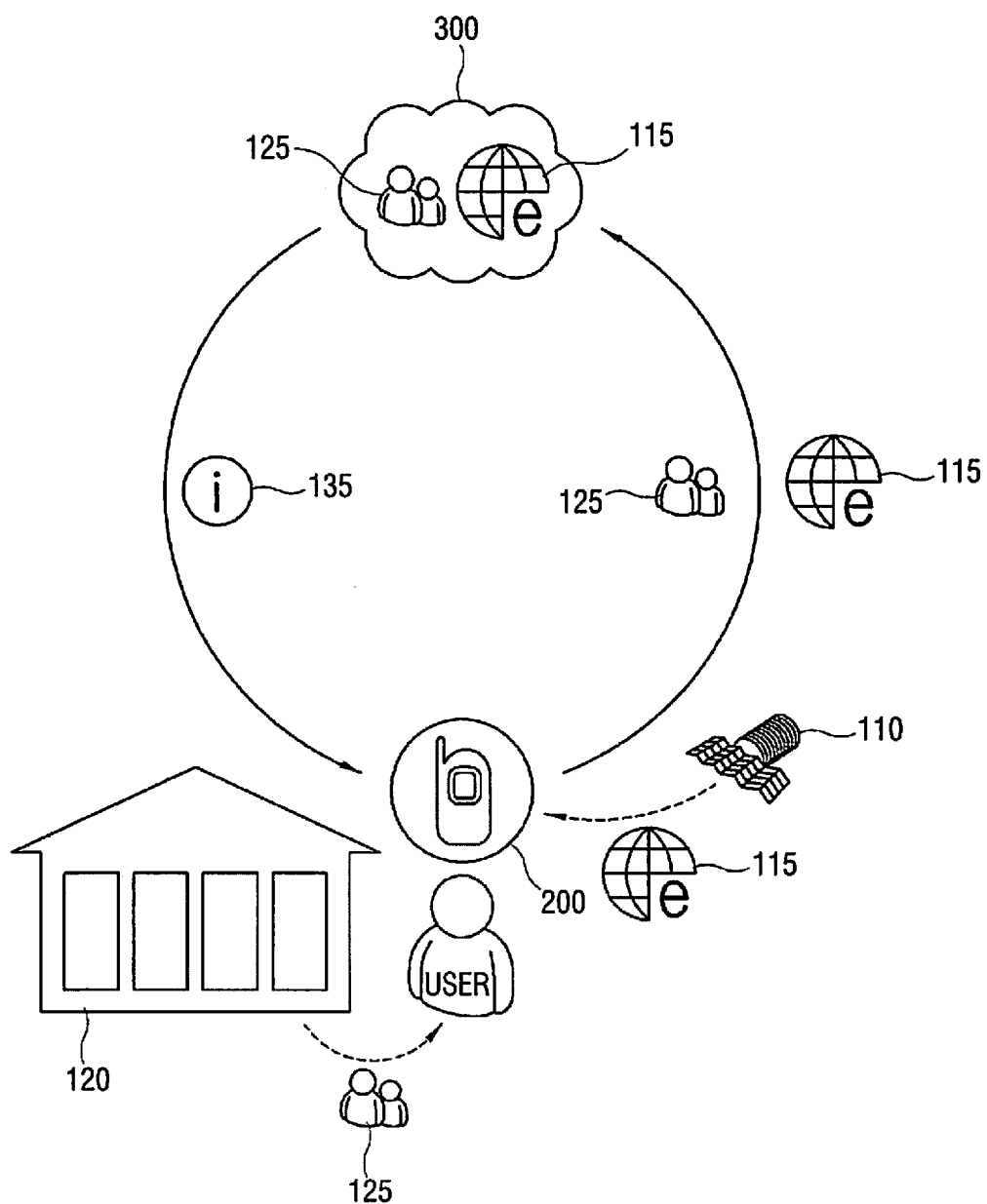
FIG. 1 is a diagram illustrating a network that includes a mobile device and a server according to an embodiment of the present invention.

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

Hereinafter, a method and apparatus for providing information of a current location using a mobile device 200 is explained with reference to FIGS. 1 to 10. Also, a method and apparatus for providing building information included in an image captured by a camera, which is an example of the mobile device 200, is described with reference to FIGS. 11 to 16B.

FIG. 1 is a diagram illustrating a network including a mobile device and a server according to an embodiment of the present invention.

Referring to FIG. 1, a brief scenario of an application according to an embodiment of the present invention is as follows:

The mobile device 200 acquires network level location information 115. More specifically, the network level location information 115 may be location information of the mobile device 200 measured by a Global Positioning System (GPS) satellite 110.

The mobile device 200 acquires device level location information 125, which is information acquired through a device. The device level location information 125 includes information on a surrounding region 120 of the device and information input by a user through the device.

The mobile device 200 accesses a service. In this case, the mobile device 200 transmits both the network level location information 115 and the device level location information 125 to a server 300, which provides a location-based service.

The server 300 acquires new information 135 based on the two pieces of information 115, 125 received from the mobile device 200, and transmits the new information 135 to the mobile device 200.

By linking the regional information acquired through a personal device with the location-based service, the user of the mobile device 200 can acquire useful and effective information.

Figure 2:
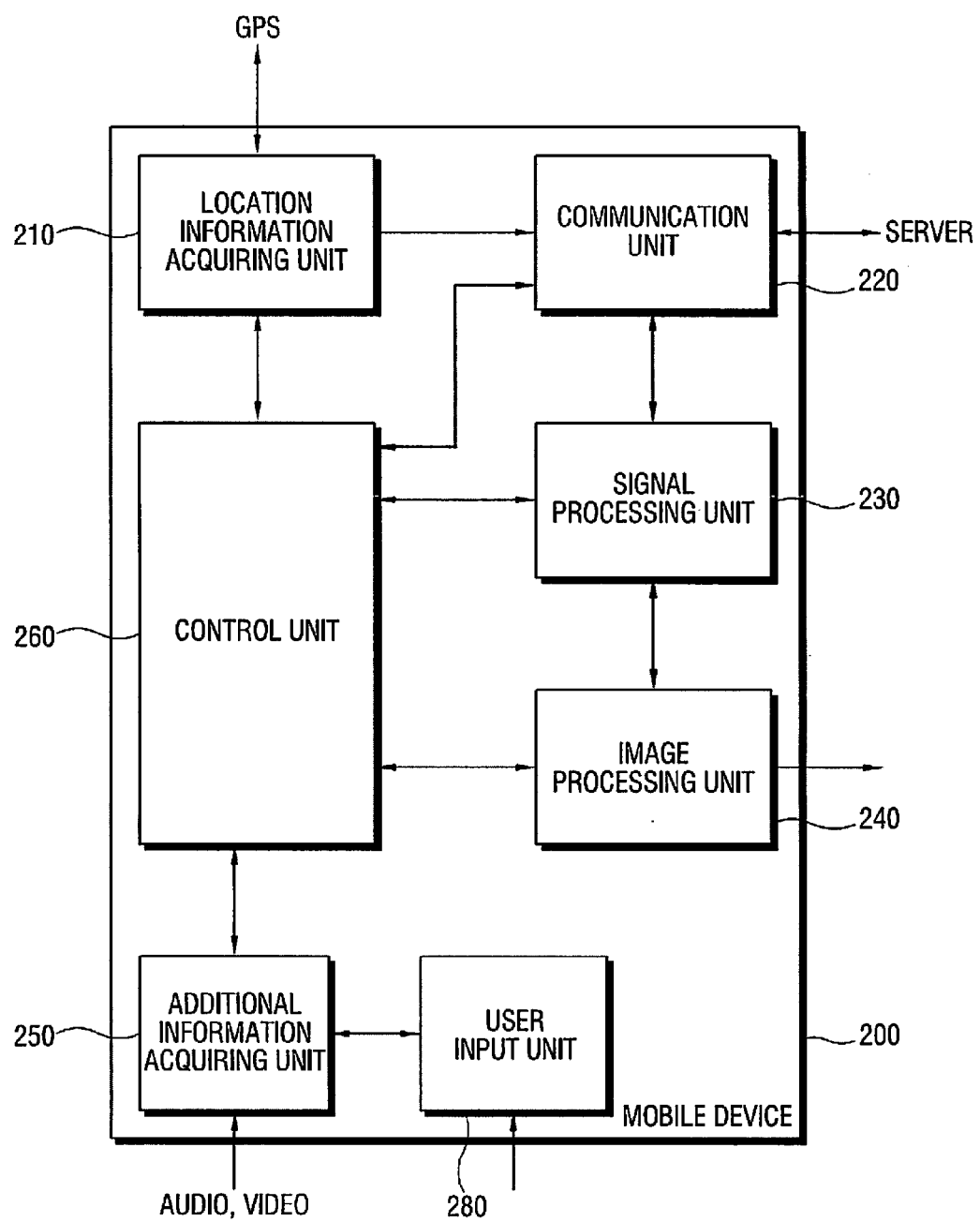
FIG. 2 is a block diagram illustrating the mobile device according to an embodiment of the present invention.

FIG. 2 is a block diagram illustrating the mobile device 200 according to an embodiment of the present invention.

Referring to FIG. 2, the mobile device 200 according to an embodiment of the present invention, may include any of a portable terminal, a Personal Digital Assistant (PDA), a Motion Picture Experts' Group (MPEG) audio layer-3 (MP3), and a laptop computer. Furthermore, the mobile device 220 can include any electronic device that can be easily carried by the user and receive its own location information from a server.

The mobile device 200 according to an embodiment of the present invention includes a location information acquiring unit 210, a communication unit 220, a signal processing unit 230, an image processing unit 240, an additional information acquiring unit 250, a control unit 250, and a user input unit 280.

The location information acquiring unit 210 acquires location information of the mobile device 200. More specifically, the location information acquiring unit 210 receives its own location information from a GPS or from a server that provides the LBS. In this case, the location information of the mobile apparatus 200 is location information of a network level and may be measured by a GPS satellite or a LBS server.

The communication unit 220 communicates with the server 300. More specifically, the communication unit 220 transmits the location information of the mobile device 200 and additional information relating to the location of the mobile device 100 to the server 300, and receives relevant information acquired based on the location information and the additional information from the server 300. The additional information relating to the location of the mobile device 200 is device level location information acquired through the mobile device 200.

The communication unit 220 communicates with the server 300 according to an Internet Protocol (IP) to exchange data with the server 300.

The signal processing unit 230 processes signals exchanged by the communication unit 220. More specifically, the signal processing unit 230 may perform encoding, decoding, and de-modulation of signals.

The image processing unit 240 displays an image based on the signal processed by the signal processing unit 230. To achieve this, the image processing unit 240 may include a display panel, such as a Liquid Crystal Display (LCD), an Organic Light Emitting Display (OLED), or a Plasma Display Panel (PDP).

The additional information acquiring unit 250 may receive the additional information relating to the location of the mobile device 200.

A format of the additional information relating to the location of the mobile device 200 may include at least one of video, audio, and text formats. More specifically, the additional information may be a captured image of surroundings of a current place, a name of the current place, and/or audio heard from the current place. Also, the additional information may indicate the height of the mobile device 200 measured by a compass sensor or the speed of the mobile device 200 measured by an acceleration sensor.

In the present example, the additional information acquiring unit 250 may include at least one of a camera, a recorder, a compass sensor, an acceleration sensor, and a gym sensor.

The user input unit 280 may receive a control signal relating to input of the additional information from the user. In this case, the user input unit 280 may receive the control signal from the user through various devices, such as a touch screen, a touch pad, and/or a key button of the mobile device 200.

The control unit 260 may control the communication unit 220 to transmit the location information of the mobile device 200 and the additional information relating to the location of the mobile device 200 to the server 300, and to receive, from the sever 300, the relevant information acquired based on the location information and the additional information. The relevant information may include detailed location information of the mobile device 200.

The control unit 260 may control the signal processing unit 230 to process the received relevant information and output the processed information. In this case, the control unit 260 may control the signal processing unit 230 to process the relevant information in at least one format, such as video, audio, and text formats, and output the processed information.

The control unit 260 may control the communication unit 220 to transmit the relevant information to another nearby device. For example, the control unit 260 may transmit the relevant information to a nearby printer and output the relevant information in the format of document.

Figure 3:
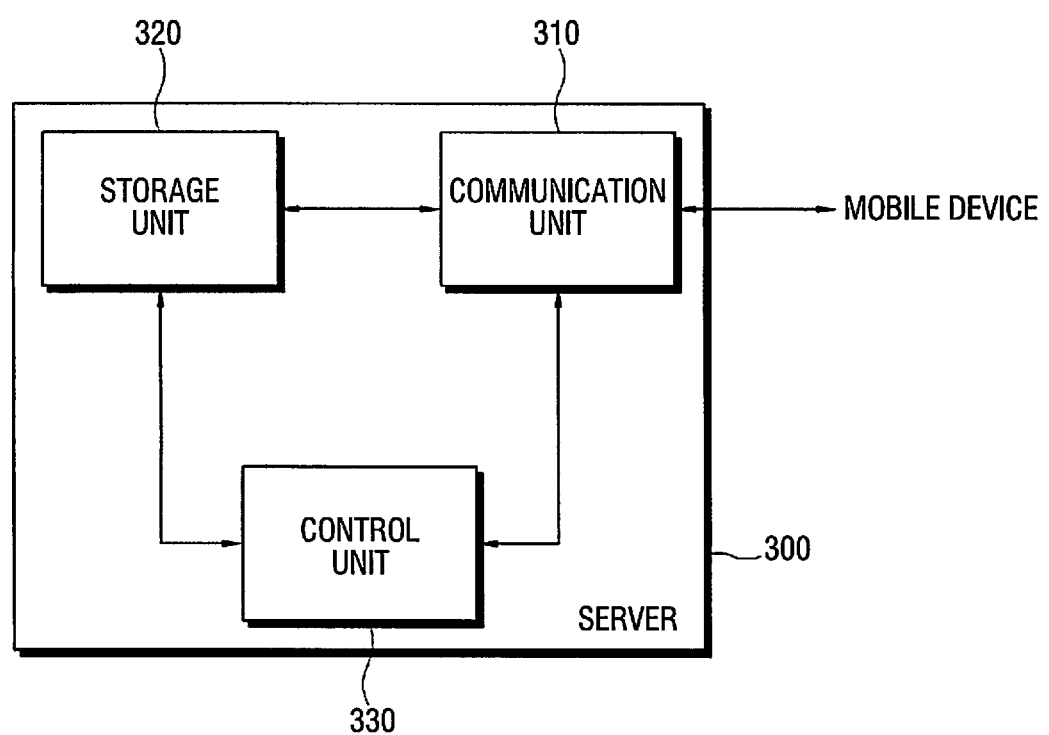
FIG. 3 is a block diagram illustrating the server, which exchanges information with the mobile device, according to an embodiment of the present invention.

FIG. 3 is a block diagram illustrating the server 300, which exchanges information with the mobile device 200 according to an embodiment of the present invention.

Referring to FIG. 3, the server 300 exchanging information with the mobile device 200 according to an exemplary embodiment may be a Personal Computer (PC) or a plurality of PCs. Furthermore, the server 300 may alternatively be any electronic device that can provide a client with a service through a network according to an exemplary embodiment of the present invention.

The server 300 includes a communication unit 310, a storage unit 320, and a control unit 330.

The communication unit 310 communicates with the mobile device 200. More specifically, the communication unit 310 receives the location information of the mobile device 200 and the additional information relating to the location of the mobile device 200 from the mobile device 200, and transmits the relevant information acquired based on the location information and the additional information to the mobile device 200. In this case, the format of the additional information may include any of video, audio, and text formats. The additional information may indicate the location of the mobile device 200, which is sensed by a compass sensor.

The storage unit 320 stores information. The information may include all information that can be provided to the mobile device 200. Furthermore, the storage unit 320 may store the location information of the mobile device 200 and the additional information relating to the location of the mobile device 200.

If the communication unit 310 receives the location information of the mobile device 200 and the additional information relating to the location of the mobile device 200 from the mobile device 200, the control unit 330 searches for the relevant information acquired based on the location information and the additional information with reference to the storage unit 320. In this case, the control unit 330 may control the communication unit 310 to transmit the searched relevant information to the mobile device 200. The relevant information may include detailed location information of the mobile device 200.

Figure 4:
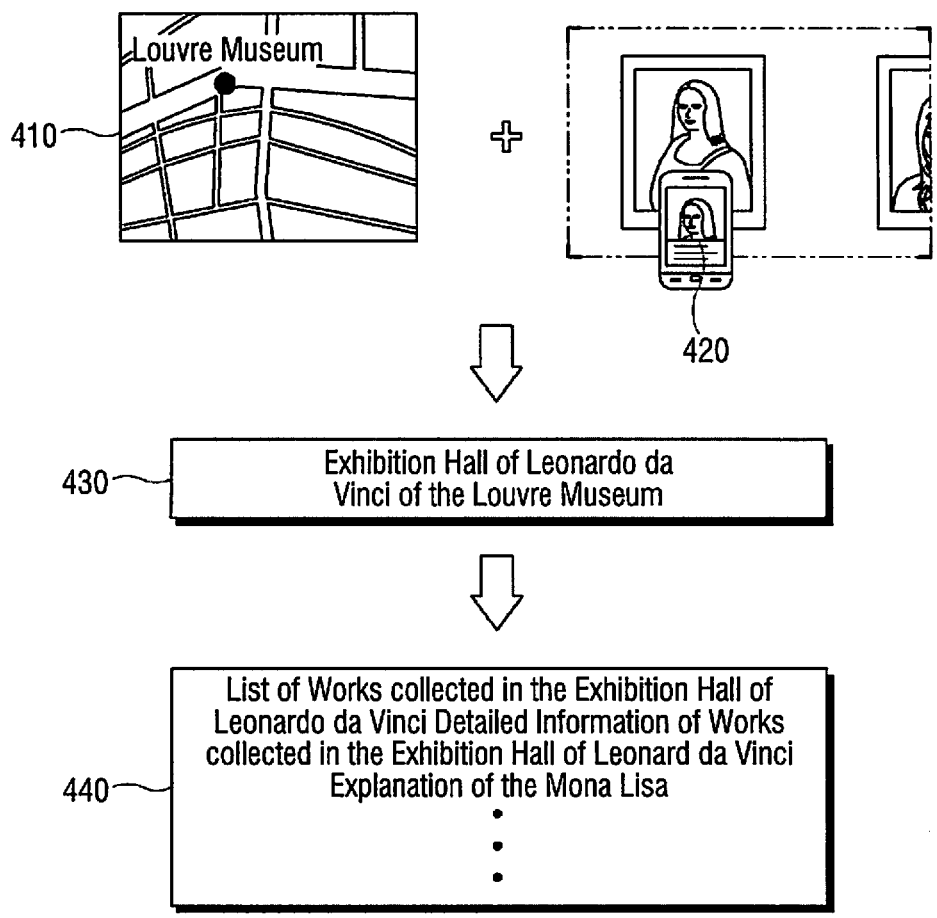
FIG. 4 is a diagram illustrating a method for acquiring information at the mobile device according an embodiment of the present invention.

FIG. 4 is a diagram illustrating a method for acquiring information at the mobile device according to an embodiment of the present invention.

Referring to FIG. 4, the user can acquire new information by linking location information of the mobile device 200 with regional information of a video format acquired through the mobile device 200.

In the example illustrated in FIG. 4, a user of the mobile device 200 is looking at the painting Mona Lisa in the Louvre museum. The mobile device 200 acquires location information of the mobile device 200 from a GPS server. The location information of the mobile device 200 is displayed as the "Louvre Museum" in FIG. 4, at 410.

The user may also input additional information relating to the location of the mobile device 200 using his/her own mobile device 200. In this case, the additional information relating to the location of the mobile device 200 is regional information of a video format. More specifically, as shown in FIG. 4, the user captures an image of the Mona Lisa painting using the mobile device 200, in item 420. The regional information of the video format is "In front of the Mona Lisa."

The mobile device 200 transmits the location information of the mobile device 200 and the additional information relating to the location of the mobile device 200 to the server 300. More specifically, the mobile device 200 transmits the information that the user is located in the Louvre museum and the image of the Mona Lisa to the server 300.

The server 300 searches for relevant information acquired based on the location information and the additional information. Then, the server 300 transmits the relevant information to the mobile device 200. More specifically, the server 300 can acquire detailed location of the mobile device 200 using the location information of the mobile device 200 acquired in a network level and the regional information of the mobile device 200 acquired in a device level. In this case, the server 300 determines that the user is currently located in the exhibition hall 'Leonardo da Vinci' of the Louvre museum, in item 430, based on the information "the Louvre museum" and "Before the Mona Lisa".

Furthermore, based on the detailed location of the user, the server 300 can provide information relating to the detailed location. For example, the server 300 may provide information such as a list of works collected in the exhibition hall 'Leonardo da Vinci', detailed information of the works collected in the exhibition hall 'Leonardo da Vinci', and an explanation of the Mona Lisa to the mobile device 200, in item 440.

There is a limitation to the location information that is acquired by a GPS system alone. More specifically, although a user of the mobile device 200 is located in the museum Louvre in FIG. 4, the GPS system cannot determine which exhibition hall the user is located in without additional information.

According to an embodiment of the present invention, by linking information of a region where the user is located with the location information, the user can be provided with detailed location information and information relating to the detailed location. Therefore, the user can effectively acquire more useful detailed information.

Figure 5:
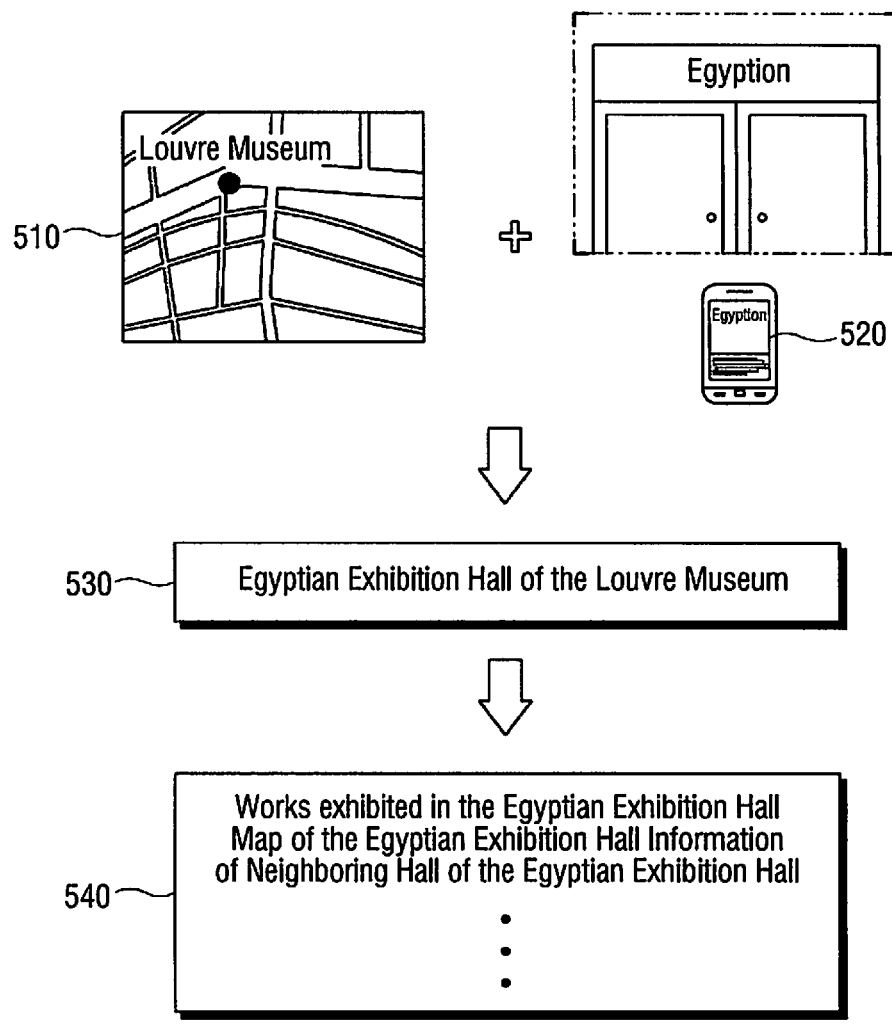
FIG. 5 is a diagram illustrating a method for acquiring information at the mobile device according to another embodiment of the present invention.

FIG. 5 is a diagram illustrating a method for acquiring information at the mobile device according to another embodiment of the present invention.

Referring to FIG. 5, the user can acquire new information by linking location information of the mobile device 200 with regional information of a text format acquired through the mobile device 200.

Currently, a user of the mobile device 200 is standing before the Egyptian exhibition hall in the Louvre museum. In this case, the mobile device 200 acquires location information of the mobile device 200, that is, the "Louvre museum", at item 510.

The user inputs additional information relating to the location of the mobile device 200. In the present example, the additional information relating to the location of the mobile device 200 is regional information of a text format. More specifically, as shown in FIG. 5, the user inputs the name of an exhibition hall where the user is located to the mobile device 200 in the text format, at item 520. In the present example, the text format regional information is "Egyptian."

The mobile device 200 transmits the information indicating that the user is located in the Louvre museum and the information indicating that the user is located in front of the Egyptian exhibition hall to the server 300.

The server 300 determines that the user of the mobile device 200 is located in front of the Egyptian exhibition hall in the Louvre museum based on the information the "Louvre museum" and the information "In Front of the Egyptian exhibition hall", at item 530. The server 300 may also provide relevant information such as works collected in the Egyptian exhibition hall, a map of the Egyptian exhibition hall, and information of neighboring exhibition halls of the Egyptian exhibition hall to the mobile device 200, at item 540.

According to the above-described embodiment of the present invention, by linking a name of a place where the user is located with the location information, the server 300 can find detailed and correct information of the location of the user and can provide the user with personalized information based on this information.

Figure 6:
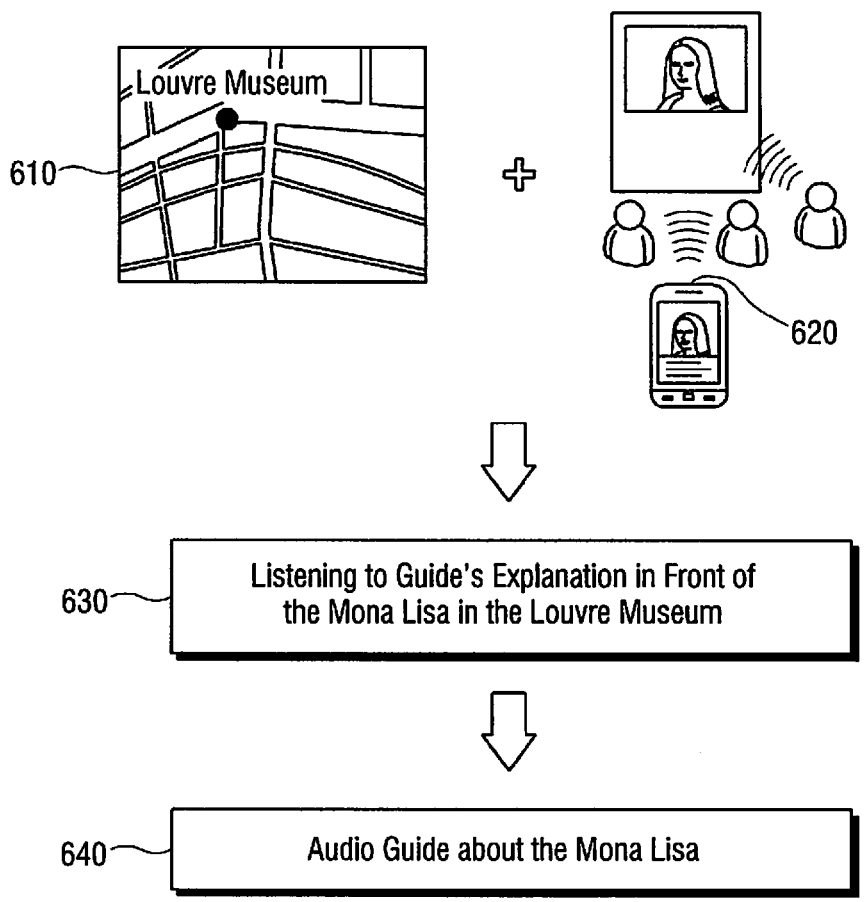
FIG. 6 is a diagram illustrating a method for acquiring information at the mobile device according to still another embodiment of the present invention.

FIG. 6 is a diagram illustrating a method for acquiring information at the mobile device 200 according to still another embodiment of the present invention.

Referring to FIG. 6, the user can acquire new information by linking location information of the mobile device 200 with regional information of an audio format acquired through the mobile device 200.

In the present example, a user of the mobile device 200 is listening to a guide's explanation in front of the Mona Lisa painting in the museum Louvre. While the user is in front of the Mona List painting, the mobile device 200 acquires location information of the mobile device 200, that is, the "Louvre museum", at item 610.

The user inputs additional information relating to the location of the mobile device 200. More specifically, the additional information relating to the location of the mobile device 200 is regional information of an audio format. As shown in FIG. 6, the user records the guide's explanation on the mobile device 200, at item 620. In this case, the regional information of the audio format is "Listening to the guide's explanation about the Mona Lisa".

The mobile device 200 transmits, to the server 300, the information indicating that the user is located in the Louvre museum and the information indicating that the user is listening to the guide's explanation about the painting Mona Lisa.

The server 300 combines the information the "Louvre museum" and the information "Listening to the guide's explanation about the Mona Lisa" and determines that the user of the mobile device 200 is listening to the guide's explanation about the Mona Lisa in the museum Louvre, at item 5630. Furthermore, the server 300 may provide the mobile device 200 with an audio guide about the Mona Lisa, at item 640.

Figure 7:
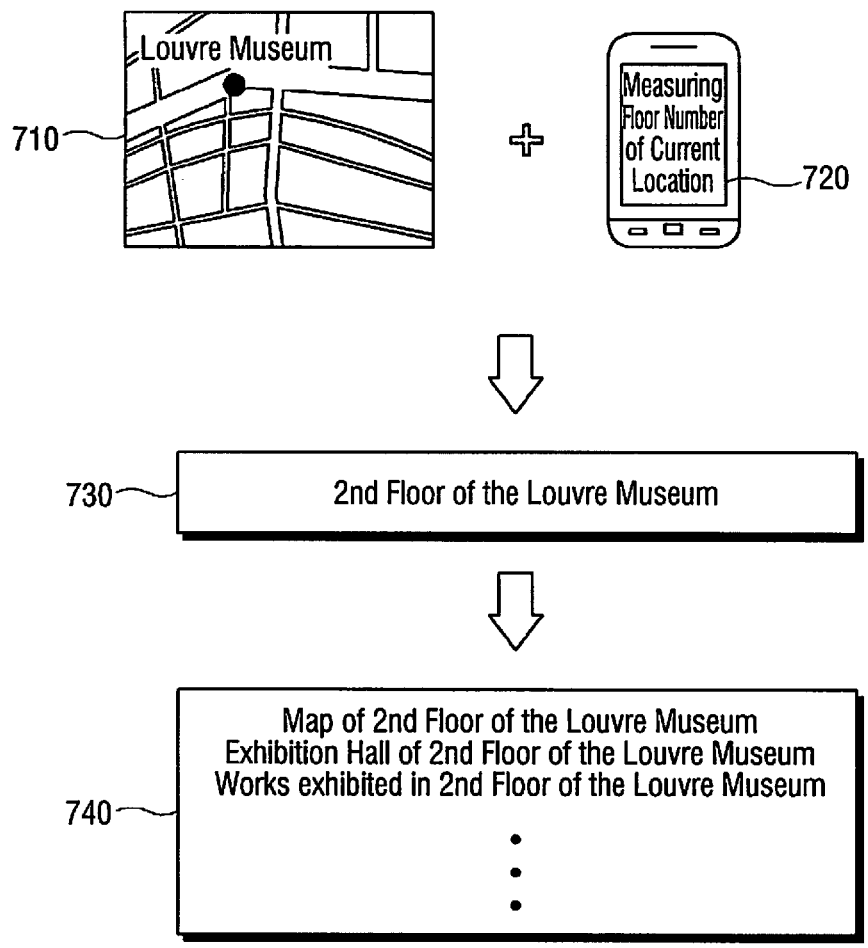
FIG. 7 is a diagram illustrating a method for acquiring information at the mobile device according to yet another embodiment of the present invention.

FIG. 7 is a diagram illustrating a method for acquiring information at the mobile device 200 according to yet another embodiment of the present invention.

Referring to FIG. 7, the user can acquire new information by linking location information of the mobile device 200 with regional information of the mobile device 200 acquired through the mobile device 200. In the present example, the location information of the mobile device 200 is location information of a network level and is acquired by a GPS server. The regional information of the mobile device 200 acquired through the mobile device 200 is location information of a device level, and the regional information is acquired by the mobile device 200 itself. More specifically, the regional information of the mobile device 200 acquired through the mobile device 200 may include height information acquired by a compass sensor, speed information acquired by an acceleration sensor or a gym sensor, and motion information acquired by a gym sensor.

In the present example, a user of the mobile device 200 is located on the second floor of the Louvre museum, and the mobile device 200 acquires location information of the mobile device 200, i.e., the "Louvre museum", at item 710.

The user searches for regional information of the mobile device 200 acquirable through the mobile device 200. More specifically, as shown in FIG. 7, the user measures a current floor number using the mobile device 200, at item 720. More specifically, the mobile device 200 determines which floor the mobile device is located on using a compass sensor included therein. The mobile device 200 measures the distance of the mobile device 200 from the ground and calculates a floor number of the floor where the mobile device 200 is located based on the measured height. In FIG. 7, the information indicating that the mobile device 200 is located on the second floor is acquired.

The mobile device 200 transmits, to the server 300, the information indicating that the user is located in the Louvre museum and the information indicating that the user is located on the second floor.

In this case, the server 300 combines the information indicating the "Louvre museum" and the information indicating the "Second Floor" and determines that the user of the mobile device 200 is located on the second floor of the Louvre museum, at item 730. Based on this combined information, the server 300 may provide information regarding a map of the second floor of the Louvre museum, exhibition halls on the second floor of the Louvre museum, and information about works exhibited in the second floor of the Louvre museum, at item 740.

Figure 8:
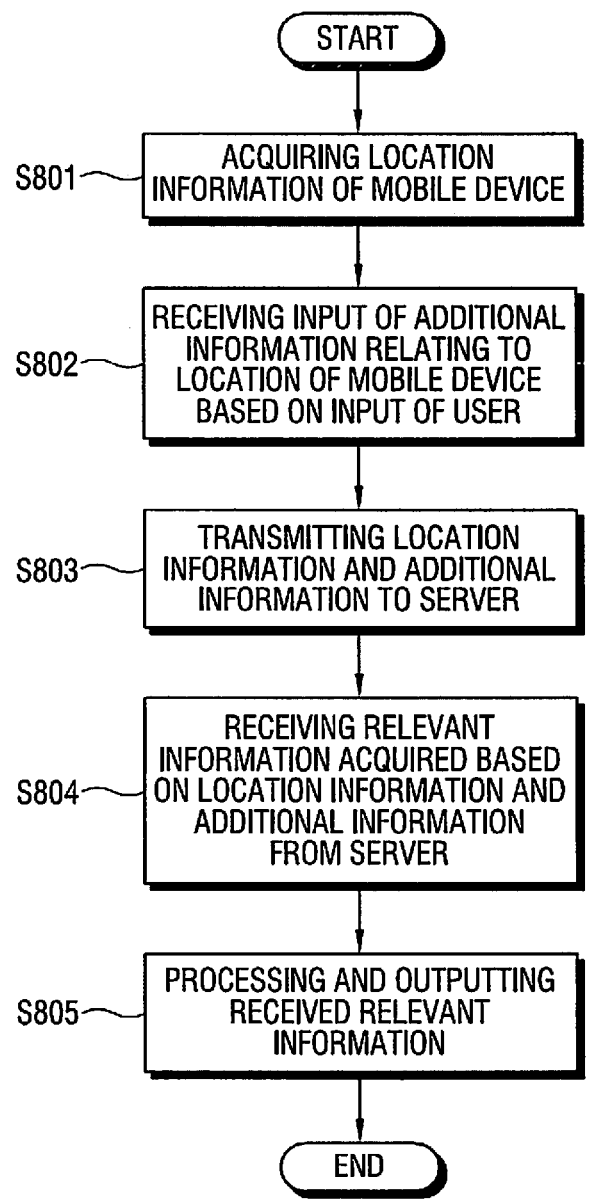
FIG. 8 is a flowchart illustrating a process of acquiring information at the mobile device according to an embodiment of the present invention.

FIG. 8 is a flowchart illustrating a process of acquiring information at the mobile device according to an embodiment of the present invention.

The mobile device 200 acquires location information of the mobile device, in step S801. In this operation, the location information of the mobile device 200 is network level location information, and may be measured by a GPS satellite or an LBS server.

The mobile device 200 receives additional information relating to the location of the mobile device 200 based on a user's input, in step S802. The additional information relating to the location of the mobile device 200 is location information of a device level and may be acquired by the mobile device 200.

The mobile device 200 transmits the location information and the additional information to the server 300, in step S803.

The mobile device 200 receives relevant information acquired based on the location information and the additional information from the server 300, in step S804.

The mobile device 200 processes the received relevant information and outputs the relevant information, in step S805. In this operation, the mobile device 200 may process the relevant information in at least one format of video, audio, and text formats and output the processed information.

Figure 9:
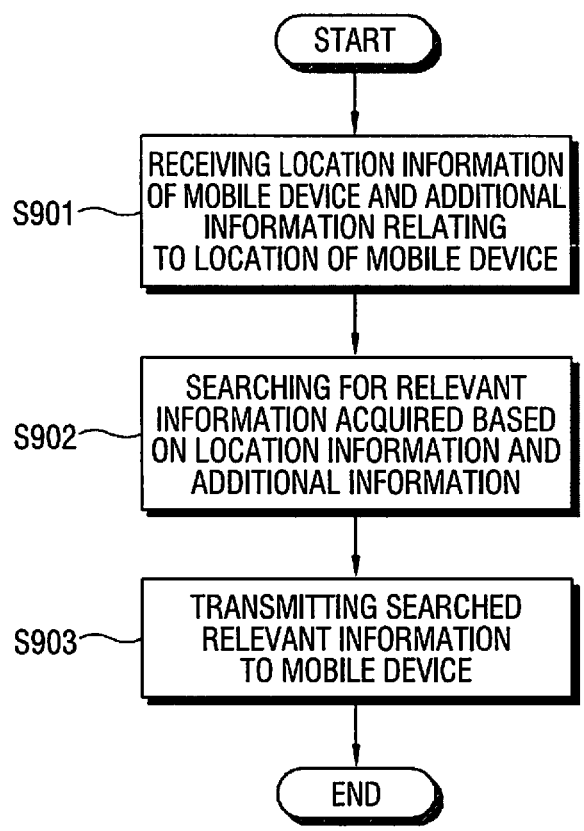
FIG. 9 is a flowchart illustrating a process of providing information at the server, which exchanges information with the mobile device, according to an embodiment of the present invention.

FIG. 9 is a flowchart illustrating a process of providing information at the server 300, which exchanges information with the mobile device 200 according to an embodiment of the present invention.

The server 300 receives the location information of the mobile device 200 and the additional information relating to the location of the mobile device 200 from the mobile device 200, in step S901.

The server 300 searches for relevant information acquired based on the location information and the additional information, in step S902.

The server 300 transmits the searched relevant information to the mobile device 200, in step S903.

Figure 10:
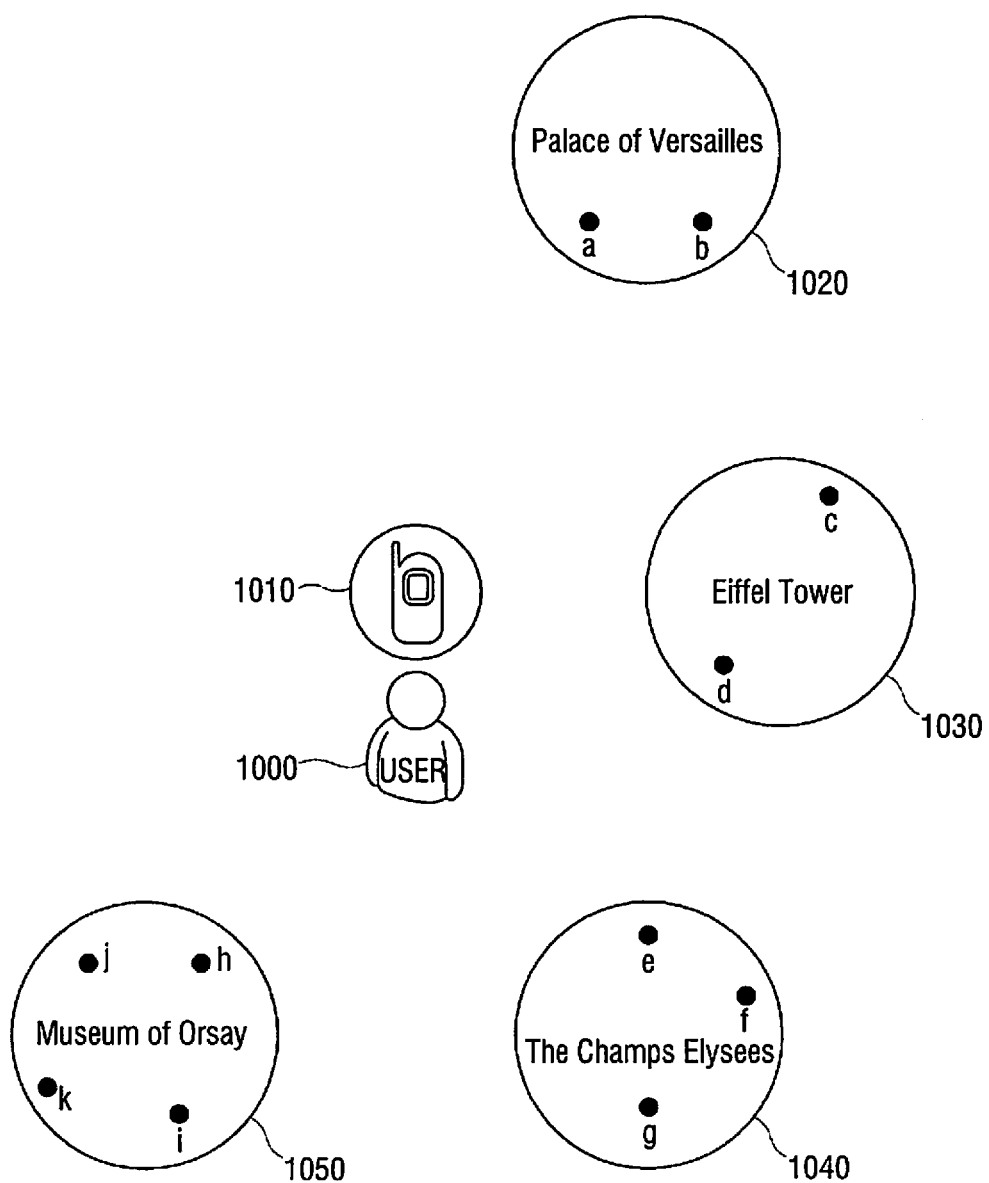
FIG. 10 is a diagram illustrating a method for acquiring information at the mobile device according to another embodiment of the present invention.

FIG. 10 is a diagram illustrating a method for acquiring information at a mobile device according to another embodiment of the present invention.

Referring to FIG. 10, a user 1000 wishes to travel to Paris, and buys a travel-related application. More specifically, the user 1000 may buy an application including information regarding spots he/she wishes to visit. In FIG. 7, the user buys an application regarding the palace of Versailles 1020, the Eiffel tower 1030, the Champs Elysees 1040, and the Orsay museum 1050. The user 1000 can use the application through a mobile device 1010.

Each location 1020, 1030, 1040, 1050 includes respective identification marks (a, b, c, d, e, f, g, h, i, j, k) to inform a location of the user. For example, the palace of Versailles has marks 'a' and 'b'. The mark 'a' exists in the main building of the palace of Versailles 1020 and the mark 'b' exists in the annex building of the palace of Versailles 1020. The mark refers to an object to identify a specific location and to be photographed by the mobile terminal.

If the user inputs the mark 'a' in the main building of the palace of Versailles 1020, the user is provided with information of a map, a tour guide, and a historical explanation of the main building of the palace of Versailles 1020. If the user subsequently moves to the annex building of the palace of Versailles 1020 and inputs the mark 'b', the user is provided with information of a map, a tour guide, and a historical explanation of the annex building.

According to the above-described embodiment of the present invention, if the user inputs the mark existing in a current location into the mobile device 200 while moving, the user is provided with correct information matching with the current location by the mobile device 200 on a real time basis.

Hereinafter, with reference to FIGS. 11 to 16B, a method, according to an embodiment of the present invention, for providing building information included in an image captured by a camera, which is an example of the mobile device 200, is explained.

Figure 11:
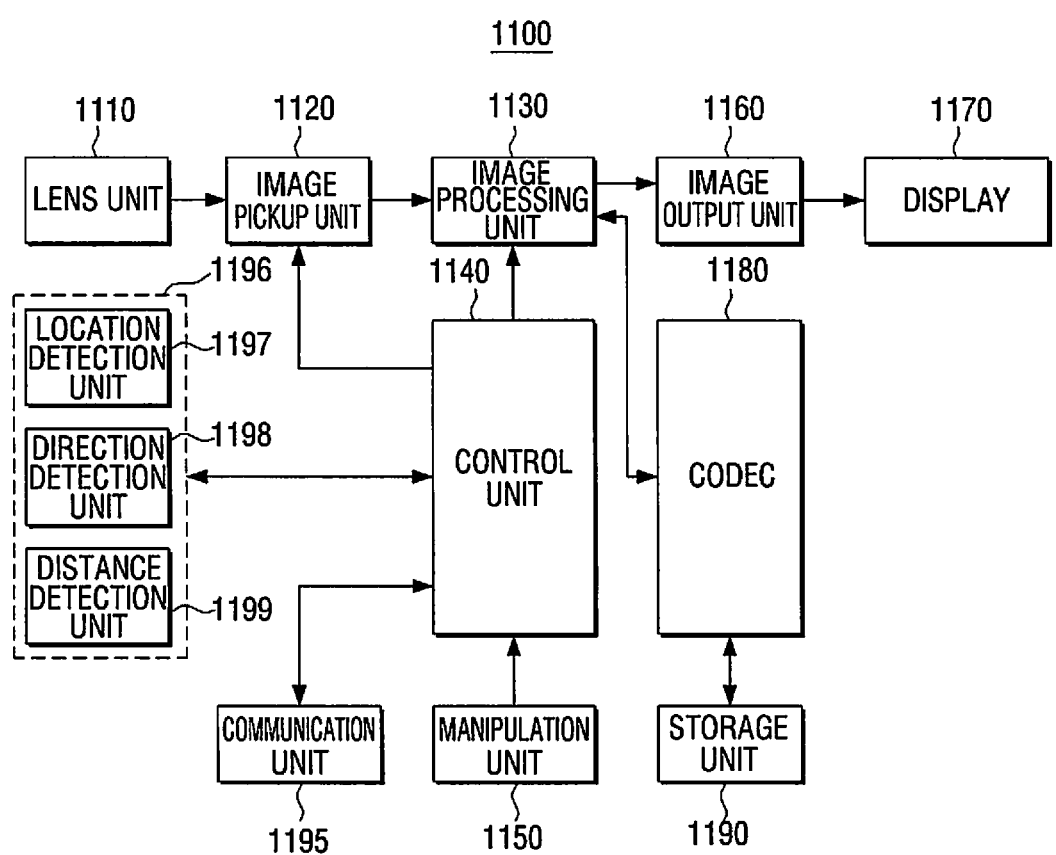
FIG. 11 is a block diagram illustrating a camera according to an embodiment of the present invention.

FIG. 11 is a block diagram illustrating a camera 1100 according to an embodiment of the present invention. As shown in FIG. 11, the camera 1100 includes a lens unit 1110, an image pickup unit 1120, an image processing unit 1130, a control unit 1140, a manipulation unit 1150, an image output unit 1160, a display 1170, a codec 1180, a storage unit 1190, a communication unit 1195, and a detection unit 1196.

The lens unit 1110 collects light from a subject, thereby focusing an optical image on an image area.

The image pickup unit 1120 performs photoelectric conversion to convert the light entering through a lens into electric signals, and performs signal-processing with respect to the electric signals. The image pickup unit 1120 includes pixels and an Analog-to-Digital (AD) converter. Each pixel outputs an analog video signal. The AD converter converts the analog video signal into a digital video signal and outputs the digital video signal.

The image processing unit 1130 performs signal-processing with respect to the image input from the image pickup unit 1120, and transmits the processed image signal to the image output unit 1160 so that the captured image is displayed. The image processing unit 1130 also outputs the processed video signal to the codec 1180 so that the captured image is stored.

More specifically, the image processing unit 1130 performs format conversion and digital zoom, Auto White Balance (AWB) Auto Focus (AF), and Auto Exposure (AE) for adjusting an image scale with respect to the video signal output from the image pickup unit 1120.

The image processing unit 1130 extracts a building from the captured image. Herein, the term "captured image" refers to an image that is sensed by the image pickup unit 1120 and displayed on the display 1170, i.e., "captured image" includes a literal captured image itself as well as an image displayed on the display 1170 on a standby mode.

The image processing unit 1130 recognizes a boundary between objects included in the captured image, and recognizes the shape of the boundary of the object to determine whether the object is a building, i.e., the image processing unit 1130 can detect a building from the captured image.

The image processing unit 1130 also receives an image of contents stored in the storage unit 1190 through the codec 1180 and process the image. The image processing unit 1130 outputs the processed image of the contents to the image output unit 1160.

The image output unit 1160 outputs the video signal received from the image processing unit 1130 to the internal display 1170 or an external output terminal.

The display 1170 displays the captured image on a screen, and may display information of the building on the captured image.

The codec 1180 encodes the video signal received from the image processing unit 1130. The codec 1130 transmits the encoded video signal to the storage unit 1190, decodes the encoded video signal of contents stored in the storage unit 1190, and transmits the decoded video signal to the image processing unit 1130.

In other words, the codec 1180 encodes the video signal in order to store the captured image and decodes the video signal in order to output the stored contents image to the image processing unit 1130.

The storage unit 1190 stores diverse multimedia contents, stores the image captured by the image pickup unit 1120 in a compressed format, and stores map information regarding various regions. The map information includes information included in a general map. Also, the map information includes coordinate information, building information, road information, and location information of each location.

The term "coordinate information" refers to unique coordinates of each point. For example, the coordinate information includes latitude and longitude information. The building information includes information of each building and includes a building name, a telephone number, the number of floors, and facilities in the building. The road information includes a mad name, a road type, and the number of lanes. The place information includes an administrative district name and a main name of a corresponding place.

The storage unit 1190 may be realized as a flash memory, a hard disk, and/or a Digital Versatile Disk (DVD).

The manipulation unit 1150 receives a command through a user's manipulation and may be provided on a surface of the camera 1110 in the form of a button, and may be provided on the display 1170 in the form of a touch screen.

The communication unit 1195 is communicably connected with an external server through diverse networks such as Internet. The communication unit 1195 may be connected to the external server using a wired Local Area Network (LAN) or a wired network, or may be connected to the external server through a wireless LAN or Bluetooth.

The detection unit 1196 detects the coordinate information of the camera 1100, and detects direction information and distance information of a building included in the captured image. The detection unit 1196 includes a location detection unit 1197 for detecting the coordinate information, a direction detection unit 1198 for detecting the direction information of the building included in the captured image, and a distance detection unit 1199 for detecting the distance information of the building included in the captured image.

The location detection unit 1197 detects unique coordinate information of a point where the camera 110 is currently located. For example, the location detection unit 1197 detects the latitude and the longitude of the point where the camera 1100 is currently located. The location detection unit 1197 includes a GPS.

The direction detection unit 1198 detects information indicating a direction from the camera 1100 to the building. In other words, the direction detection unit 1198 detects the direction information from a current location of the user to the building included in the captured image. The direction detection unit 1198 includes a compass sensor or a gym sensor.

The distance detection unit 1199 detects information indicating a distance from the camera 1100 to the building. In other words, the distance detection unit 1199 detects the distance information from a current location of the user to the building included in the captured image. The distance detection unit 1199 may include at least one of an infrared ray distance sensor, a laser distance sensor, and a distance sensor using a double camera.

As described above, the detection unit 1196 detects the coordinate information of the camera 1100, and detects the direction information and the distance information of the building included in the captured image.

The control unit 1140 controls overall operation of the camera 1100. More specifically, the controller 1140 calculates a location of an extracted building and extracts information of the building existing in the calculated location based on the map information. The control unit 1140 controls the extracted building information to be displayed along with the captured image.

The control unit 1140 determines whether the map information exists in the storage unit 1190. If the map information exists in the storage unit 1190, the control unit 1140 calculates a location of the building on the map based on the coordinate information, the direction information, and the distance information.

More specifically, the control unit 1140 detects a point where the camera 1100 is currently located on the map with reference to the detected coordinate information. The control unit 1140 determines in which direction from the current point to the building included in the captured image based on the direction information. After determining the direction, the control unit 1140 determines the distance from the current point to the building based on the distance information. Undergoing these processes, the control unit 1140 calculates the location information of the building indicating where the building included in the captured image is located on the map.

After calculating the location of the building on the map, the control unit 1140 extracts information on the building existing in the calculated location from the map information. The building information includes a building name, a telephone number, the number of floors, and facilities in the building.

However, if the map information does not exist in the storage unit 1190, the control unit 1140 transmits the detected coordinate information, direction information, and distance information to an external server. The server stores map information and performs extracting information of the building using the coordinate information, the direction information, and the distance information.

More specifically, the server detects a point where the camera 1100 is currently located on the map with reference to the detected coordinate information. The server determines the direction from the current point to the building included in the captured image based on the direction information and determines the distance from the current point to the building based on the distance information. Through the above-described process, the server can calculate location information of the building indicating where the building included in the captured image is located on the map. The server extracts information of the building existing in the calculated location from the map information stored in the server or map information over the Internet.

Accordingly, the control unit 1140 controls to receive the information of the building from the server.

The control unit 1140 controls the searched building information to be displayed along with the captured image. For example, the control unit 1140 may control the display 1170 to display a building name on the screen when displaying the captured image, as shown in FIG. 13D.

Through the above-described process, the control unit 1140 controls the display 1170 to display the building information on the captured image. Accordingly, the user can identify the building that the user is looking at simply by capturing an image of the building.

Figure 12:
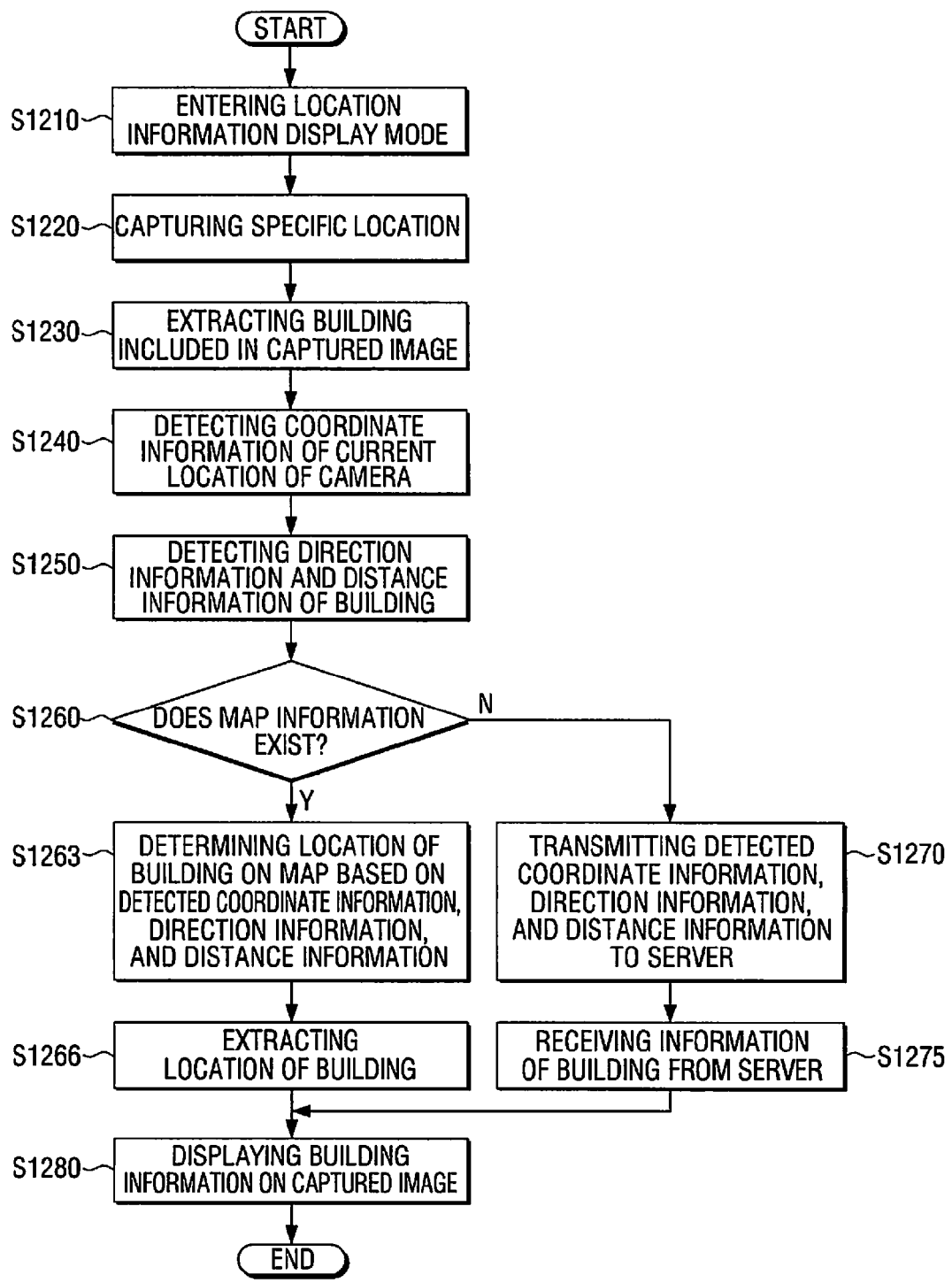
FIG. 12 is flowchart illustrating a method for displaying location information on a captured image according to an embodiment of the present invention.

FIG. 12 is a flowchart illustrating a method for displaying location information on a captured image according to an embodiment of the present invention.

The camera 1100 enters a location information display mode according to a user's manipulation, in step S1210. The location information display mode is a mode in which information about buildings, roads, and places included in a captured image is displayed along with the captured image. More specifically, if the location information display mode is activated, the camera 1100 displays coordinate information, building information, road information, and place information when displaying the captured image on the display 1170.

The term "coordinate information" refers to unique coordinates for each point. For example, the coordinate information includes information regarding the latitude and the longitude of the point. The building information is information of the building, and includes a building name, a telephone number, the number of floors, and facilities in the building. The mad information includes a mad name, a road type, and the number of lanes. The place information includes an administrative district name and a main name of a corresponding place.

If the location information display mode is activated, the camera 1100 may display names of buildings when displaying the captured image on the display 1170 as shown in FIG. 13D.

After entering the location information display mode, the camera 1100 captures a specific location according to a user's manipulation, in step S1220. The capturing includes storing an image sensed by the image pickup unit 1120, as well as displaying the image sensed by the image pickup unit 1120 on the display 1170 in a standby state.

The camera 1100 extracts a building from the captured image, in step S1230. More specifically, the camera 1100 recognizes a boundary between objects included in the captured image. The camera 110 determines the shape of the boundary of the object to determine whether the object is a building. By performing this determination, the camera 1100 can extract a building from the captured image.

After that, the camera 1100 detects coordinate information of a current location of the camera 1100, in step S1240. The camera 1100 detects unique coordinate information of a current point where the camera 1100 is located through the location detection unit 1197. For example, the location detection unit 1197 detects the latitude and the longitude of the point where the camera 1100 is located. The location detection unit 1197 includes a GPS.

The camera 1100 also detects direction information and distance information of the building included in the captured image, in step S1250. The camera 1100 detects the direction information through the direction detection unit 1198. In other words, the direction detection unit 1198 detects the direction from the current location of the user to the building included in the captured image. The direction detection unit 1198 includes a compass sensor or a gyro sensor.

The camera 1100 also detects the distance from the current location to the building through the distance detection unit 1199. In other words, the distance detection unit 1199 detects the distance information from the current location of the user to the building included in the captured image. The distance detection unit 1199 may include at least one of an infrared ray distance sensor, a laser distance sensor, and a distance sensor using a double camera.

After detecting direction and distance information, the camera 1100 determines whether map information exists in the storage unit 1190, in step S1260. If the map information exists in the storage unit 1190, the camera 1100 calculates the location of the building on the map based on the coordinate information, the direction information, and the distance information, in step S1263.

More specifically, the camera 1100 determines the point where the camera 1100 is located on the map with reference to the detected coordinate information. The camera 1100 determines the direction from the current point to the building included in the captured image based on the direction information. After determining the direction, the camera 1100 determines the distance from the current point to the building based on the distance information. Through the above-described process, the camera 1100 can calculate the location information of the building indicating where the building included in the captured image is located on the map.

After calculating the location information of the building, the camera 1100 extracts information of the building existing in the calculated location from the stored map information, in step S1266. Herein, the building information includes a building name, a telephone number, the number of floors, and facilities in the building.

However, if the map information does not exist in the storage unit 1190, the camera 1100 transmits the detected coordinate information, direction information, and distance information to an external server, in step S1270. The server stores the map information and performs extracting the building information using the coordinate information, the direction information, and the distance information.

More specifically, the server detects the point where the camera 1100 is currently located on the map with reference to the detected coordinate information. The server determines the direction from the current point to the building included in the captured image based on the direction information. After determining the direction, the server determines the distance from the current point to the building based on the distance information. Through the above-described process, the server can calculate the location information of the building indicating where the building included in the captured image is located on the map. The server extracts the information of the building existing in the calculated location from the map information stored in the server or the map information over the Internet.

Accordingly, the camera 1100 receives the building information from the server, in step S1275.

The camera 1100 displays the detected building information along with the captured image, in step S1280. For example, the camera 1100 may display the name of the building on the screen when displaying the captured image on the display 1170 as shown in FIG. 13D.

Through the above-described process, the camera 1100 displays the building information on the captured image. Accordingly, the user can identify the building that the user is looking at simply by capturing an image of the building.

Although the camera 1100 displays the building information on the captured image in the above exemplary embodiments, other information such as mad information and place information may be displayed. The mad information includes a mad name, a mad type, and the number of lanes. The place information includes an administrative district name and a main name of a corresponding place.

For example, if a mad is included in the captured image, the camera 1100 may display the name of the mad along with the captured image. For example, if a specific place such as a historic site or a stadium is included in the captured image, the camera may display the name of the specific place along with the captured image.

Hereinafter, a process of displaying building information on an image captured by the camera 1100 is explained. FIGS. 13A to 13D are diagrams illustrating a process of displaying building information on an image captured by the camera 1100 according to an embodiment of the present invention.

Figure 13A:
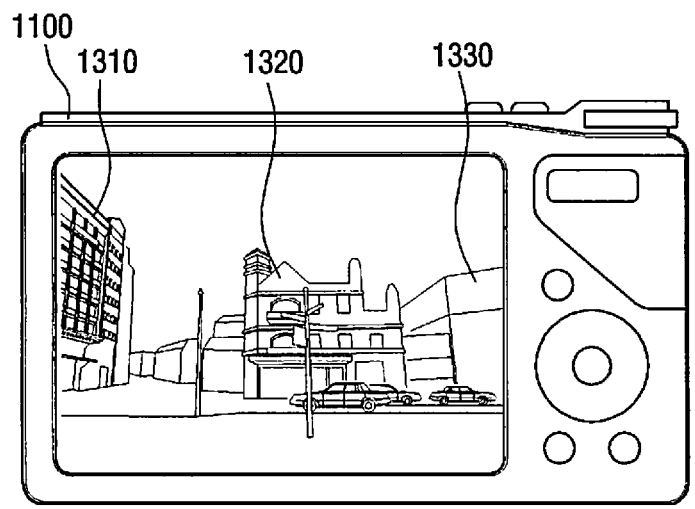
FIGS. 13A to 13D are views illustrating a process of displaying building information on an image captured by the camera according to an embodiment of the present invention.

FIG. 13A illustrates an image of a specific place captured by the camera 1100. As shown in FIG. 13A, the image being currently captured includes a first building 1310, a second building 1320, and a third building 1330. Accordingly, the camera 110 recognizes that the current image includes the first building 1310, the second building 1320, and the third building 1330.

Figure 13B:
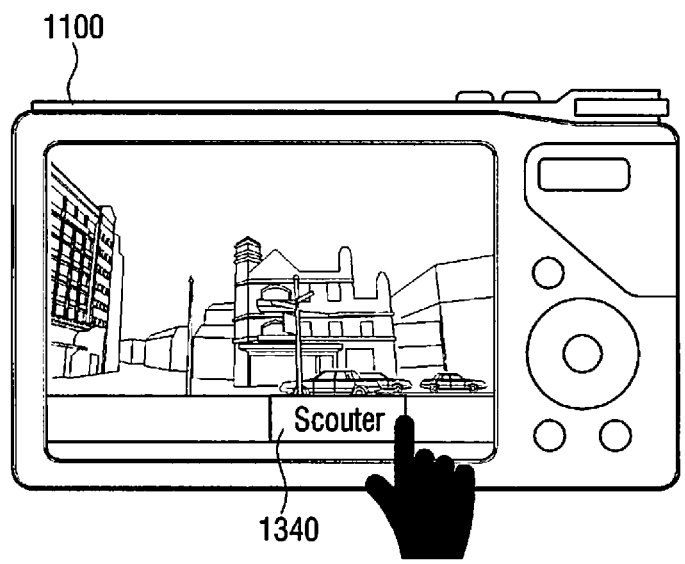

After the image recognition, as shown in FIG. 13B, the camera 1100 displays a Scouter icon 1340 on the screen. The Scouter icon 1340 is an icon for receiving a command to perform the location information display mode. Accordingly, if the user selects the Scouter icon 1340 as shown in FIG. 13B, the camera 1100 performs the location information display mode.

The location information display mode is a mode in which information regarding buildings, roads, and places included in the captured image is displayed along with the captured image. If the location information display mode is activated, the camera 1100 displays coordinate information, building information, mad information, and place information when displaying the captured image.

Figure 13C:
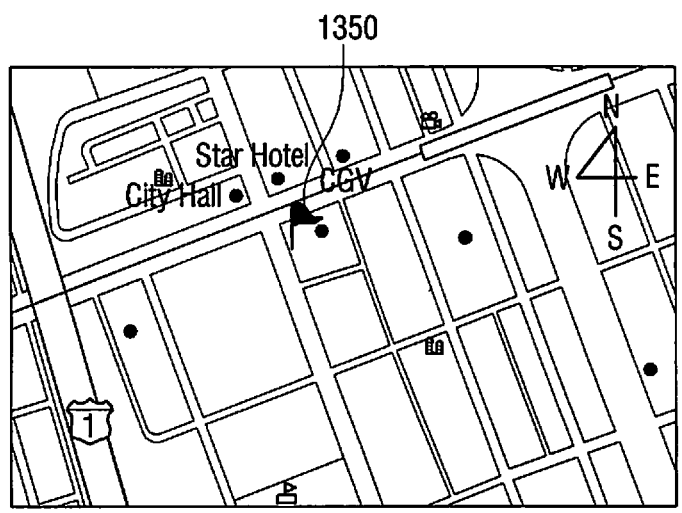
Figure 13D:
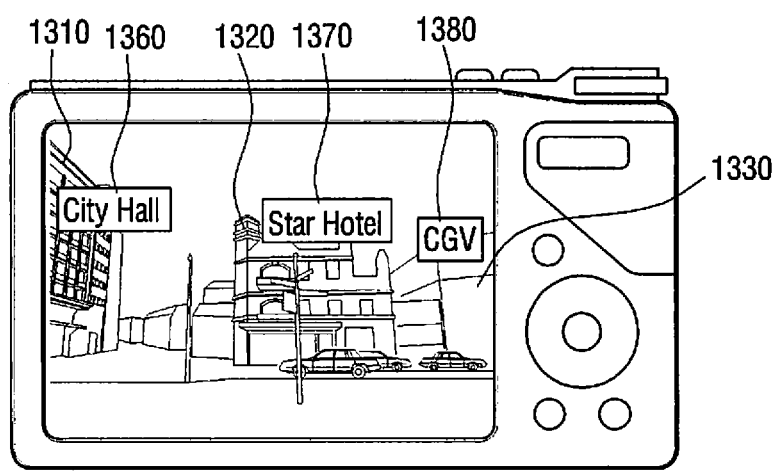

FIG. 13C illustrates map information regarding surroundings of a current location 1350. If the location information display mode is performed, the camera 1100 extracts coordinate information of the current location 1350 on the map information. The camera 1100 detects direction information and distance information of buildings included in the captured image.

As shown in FIG. 13C, referring to the map information, City Hall, Star Hotel, and CGV are to the north of the current location 1350 in sequence. In the present example, it is assumed that with reference to the direction information, the direction where the camera 1100 is capturing is North, and, with reference to the distance information, the distance from the current location to the first building 1310, the second building 1320, and the third building is the same as the distance from the current location to City Hall, Start Hotel, and CGV. Then, the camera 1100 detects that the first building 1310, the second building 1320, and the third building 1330 indicate City Hall, Star Hotel, and CGV, respectively.

Therefore, as shown in FIG. 13D, the camera 1100 displays "City Hall" as building information 1360 of the first building 1310, displays "Star Hotel" as building information 1370 of the second building 1320, and displays "CGV" as building information 1380 of the third building 1330.

As described above, the camera 1100 can display the names of the buildings along with the captured image. Therefore, the user can identify the building information of a corresponding building simply by capturing the building.

FIGS. 14A to 14H are diagrams illustrating a process of displaying building information on a captured image if the camera 1100 is a digital camera according to an embodiment of the present information.

Figure 14A:
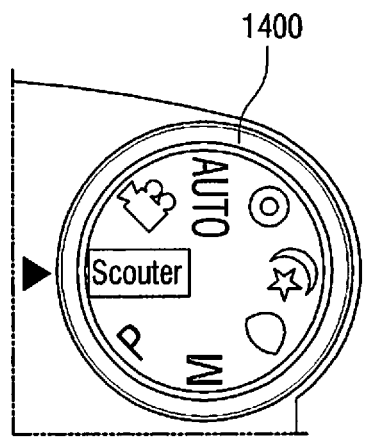
FIGS. 14A to 14H are diagrams illustrating a process of displaying building information on a captured image if the camera is a digital camera according to an embodiment of the present invention.
Figure 14B:
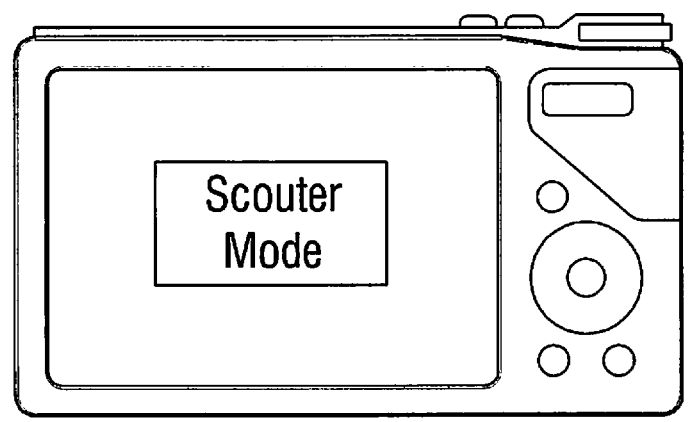

FIG. 14A is a diagram illustrating a dial 1400 for selecting an operation mode of a digital camera. As shown in FIG. 14A, if the dial 1400 is set for Scouter, the digital camera is set to a Scouter mode as shown in FIG. 14B. The Scouter mode indicates a location information display mode. The location information display mode is a mode in which information regarding buildings, roads, places included in the captured image is displayed along with the captured image. If the location information display mode is activated, the digital camera displays coordinate information, building information, road information, and place information when displaying the captured image on the screen.

Figure 14C:
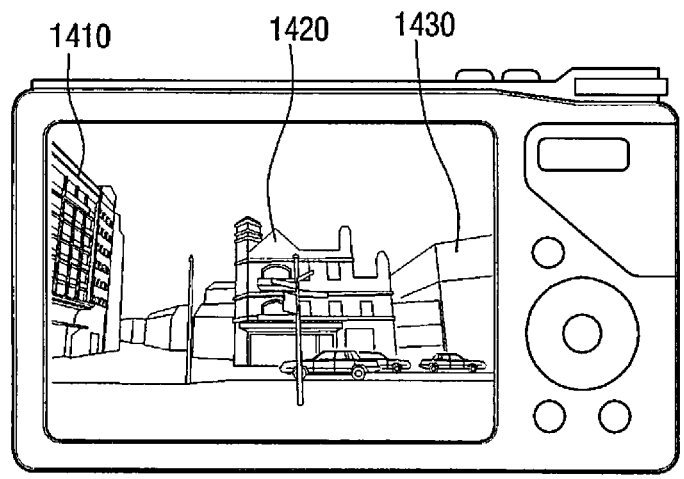
Figure 14D:
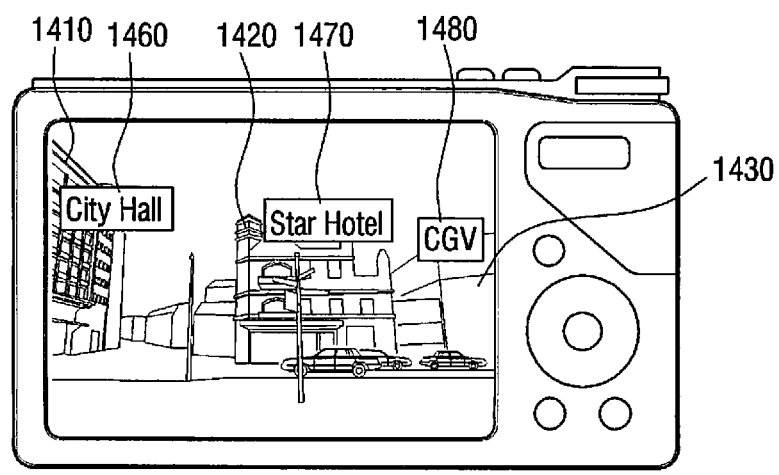

After selecting the Scouter mode, the digital camera captures an image including a first building 1410, a second building 1420, and a third building 1430 as shown in FIG. 14C. Then, since the digital camera is set to the Scouter mode, the digital camera displays "City Hall" as building information 1460 of the first building 1410, displays "Star Hotel" as building information 1460 of the second building 1420, and displays "CGV" as building information 1480 of the third building 1430, as shown in FIG. 14D.

Figure 14E:
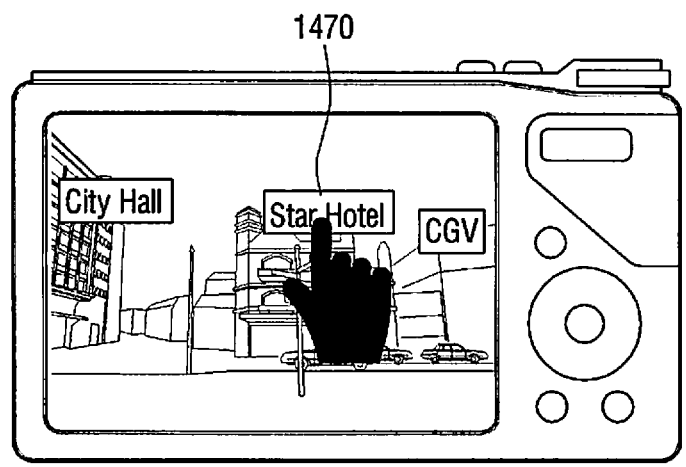
Figure 14F:
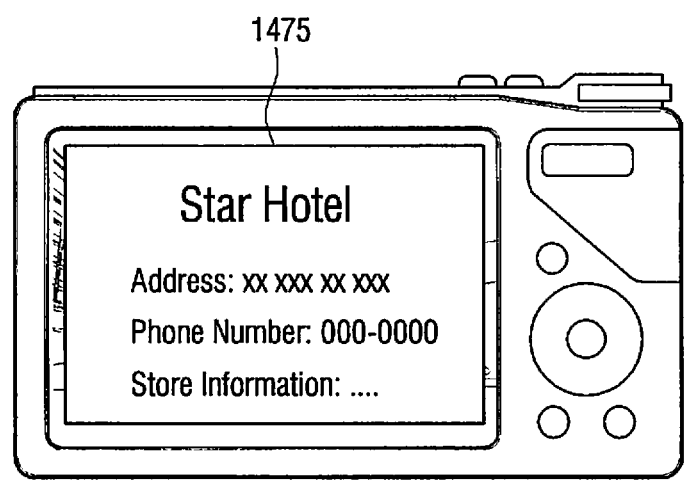

In this state, if the user selects the building information 1470 of the second building 1420 as shown in FIG. 14E, the digital camera displays detailed information 1475 of the selected second building 1420 as shown in FIG. 14F. As shown in FIG. 14F, the detailed information 1475 of the second building 1420 includes an address, a telephone number, and information regarding stores in the building.

Figure 14G:
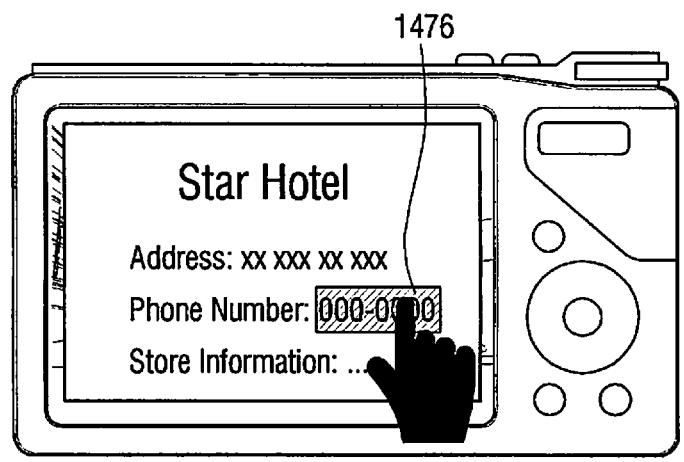
Figure 14H:
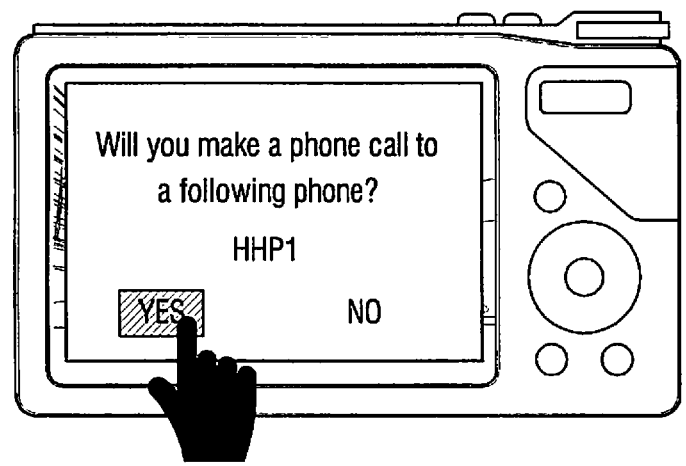

If the user selects the telephone number 1476 as shown in FIG. 14G, the digital camera receives a command to dial the selected telephone number 1476. However, since the digital camera does not support a function of calling a phone call, the digital camera displays a message for asking whether the user wishes to dial the selected telephone number 1476 using a mobile phone communicably connected with the digital camera. FIG. 14H illustrates a message for asking the user as to whether to dial the selected telephone number 1476 using a mobile phone having an ID 'HHP1'.

As described above, the digital camera displays the name of the building included in the captured image along with the captured image, and, if the displayed name of the building is selected, makes it possible to make a phone call to the building. Accordingly, the user can identify the building in front of the user with a very simple operation.

Hereinafter, a case in which the camera 1100 is a mobile phone is explained with reference to FIGS. 15A to 15H. FIGS. 15A to 15H are diagrams illustrating a process of displaying building information on a captured image if the camera 1100 is a mobile phone according to an embodiment of the present invention.

Figure 15A:
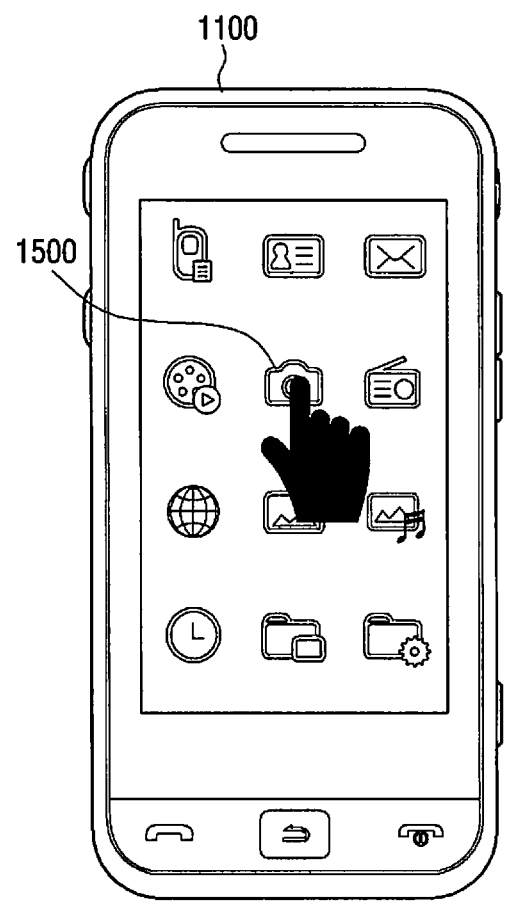
FIGS. 15A to 15H are diagrams illustrating a process of displaying building information on a captured image if the camera is a mobile phone according to an embodiment of the present invention.
Figure 15B:
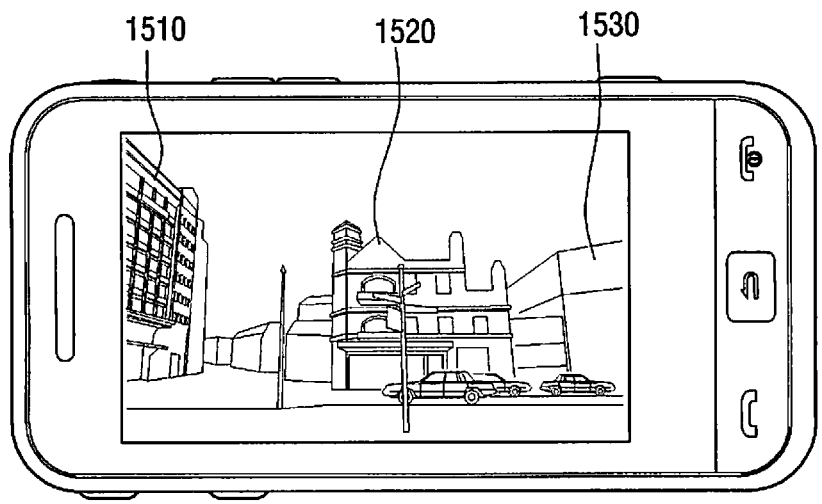

FIG. 15A is a view illustrating a main menu of a mobile phone. As shown in FIG. 15A, if the user selects a camera icon 1500, the mobile phone executes a photographing mode as shown in FIG. 15B.

Figure 15C:
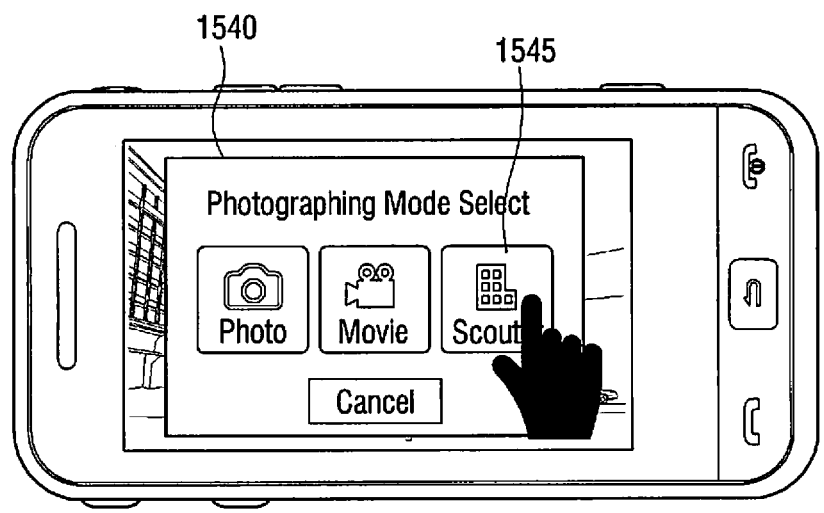

In this state, if a command to display a photographing mode selection menu 1540 is input, the mobile phone displays the photographing mode selection menu 1540 on the screen as shown in FIG. 15C. Also, as shown in FIG. 15C, if the user selects a Scouter 1545, the mobile phone is set to the Scouter mode.

Figure 15D:
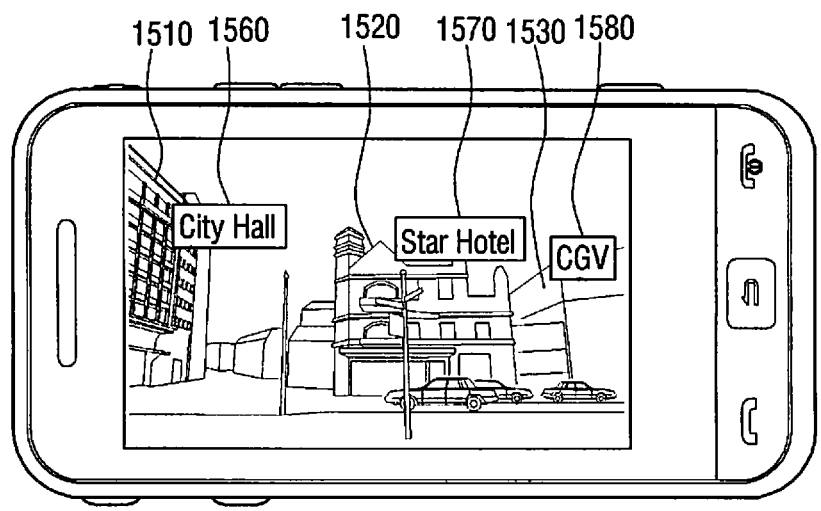

If the Scouter mode is set, the mobile phone displays "City Hall" as building information 1560 of a first building 1510, displays "Star Hotel" as building information 1570 of a second building 1520, and displays "CGV" as building information 1580 of a third building, as shown in FIG. 15D.

Figure 15E:
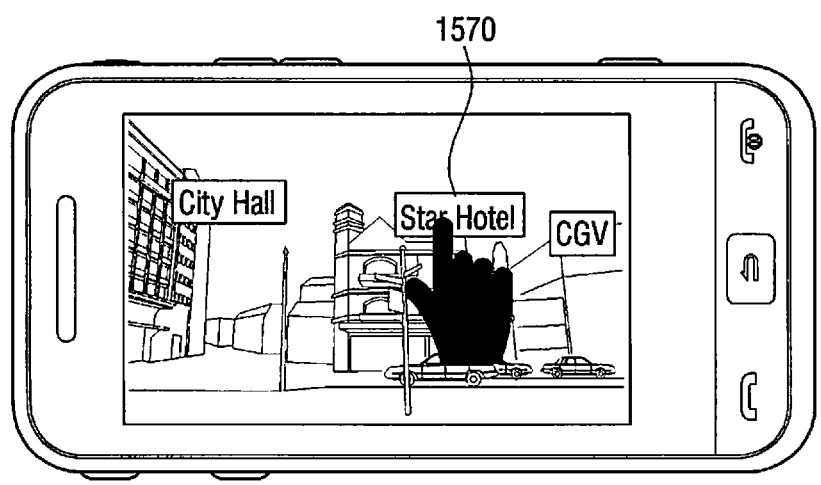
Figure 15F:
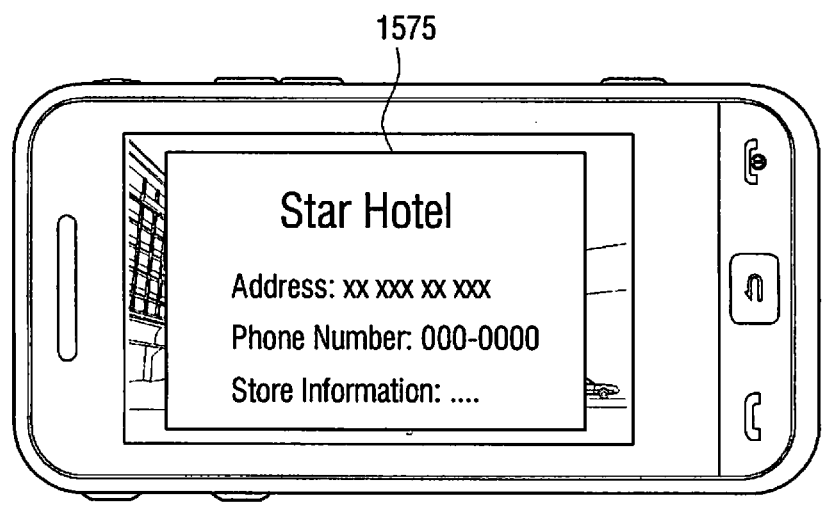

In this state, if the user selects the building information 1570 of the second building 1520 as shown in FIG. 15E, the mobile phone displays detailed information 1575 of the second building 1520 as shown in FIG. 15F. The detailed information 1575 of the second building 1520 may include an address, a telephone number, and information of stores in the building, as shown in FIG. 15F.

Figure 15G:
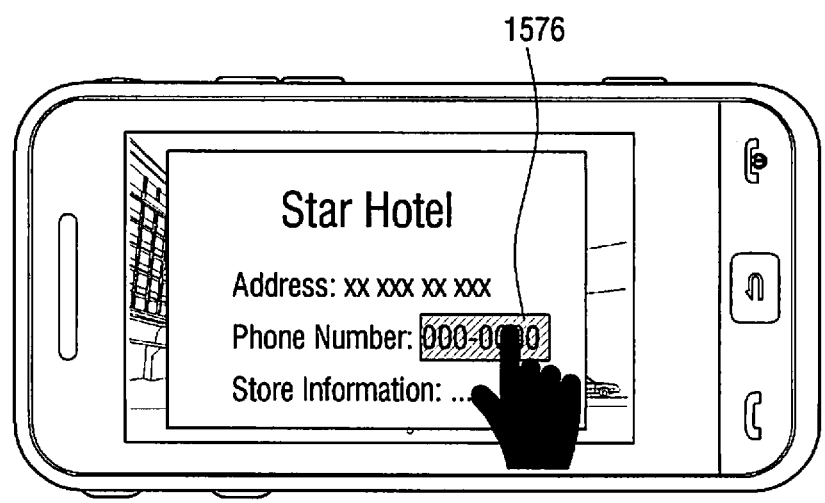
Figure 15H:
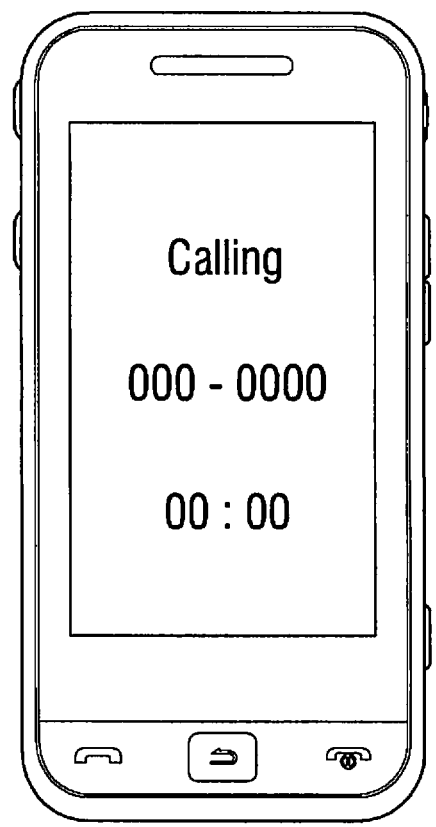

If the user selects a telephone number 1576 as shown in FIG. 15G, the mobile phone receives a command to dial the selected telephone number 1576. Therefore, the mobile phone directly calls the telephone number 1576 as shown in FIG. 15H.

As described above, the mobile phone displays the name of the building along with the captured image, and makes a phone call to the building if the name of the building is selected. Therefore, the user can identify the building in front of the user with a very simple operation.

Hereinafter, a method for setting a category of interest is explained with reference to FIGS. 16A and 16B.

Figure 16A:
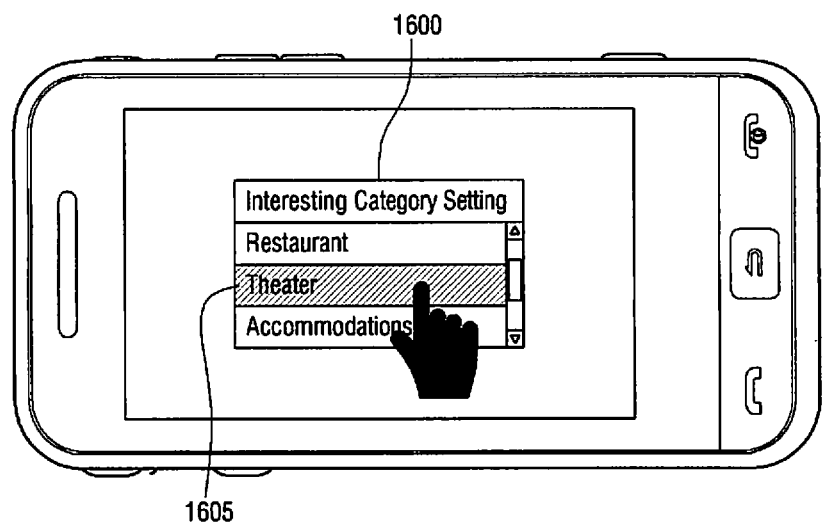
FIGS. 16A and 16B are diagrams illustrating a process of setting a category of interest according to an embodiment of the present invention.
Figure 16B:
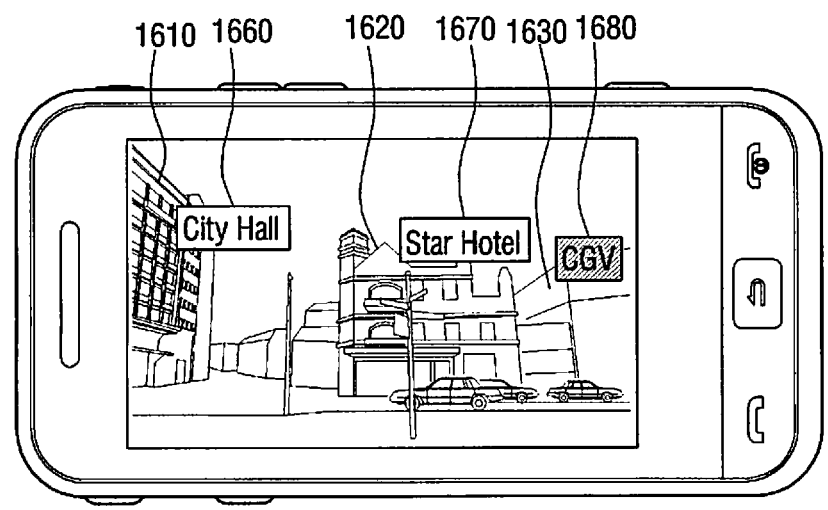

As shown in FIG. 16A, the camera 1100 may display a category of interest setting menu 1600 on the screen. The category of interest indicates a type of building preferred by the user, and is a category for purposes of buildings, and includes a restaurant, a theater, accommodations, a public office, and a department store, for example.

As shown in FIG. 16A, the user may select a theater 1605 as a category of interest. Then, the camera 1100 displays building information of the theater 1605 so that the building information of the theater 1605 is distinguished from building information of the other buildings. In other words, the camera 1100 displays the building information of a building set as a category of interest so that the building is distinguished from the other buildings. For example, the camera 1100 highlights the building information of a building set as an interesting category.

Accordingly, if the user sets the theater 1605 as belonging to the category of interest as shown in FIG. 16A, the camera 1100 highlights building information 1680 of a third building 1630 which indicates a theater. Accordingly, the building information of the third building 1630 is clearly distinguished from building information 1660 of a first building 1610 and building information 1670 of a second building 1620.

In this case, the camera 1100 selects the category of interest for the type of building according to a user's manipulation. Also, the camera 1100 can display the information of the building corresponding to the category of interest so that the information of the building of the interesting category is distinguished from the other buildings.

As described above, the camera 1100 can display the building information of the building corresponding to the category of interest set by the user so that the information of the building of the category of interest is distinguished from the other buildings. Accordingly, the user can easily find the building of the desired category.

The camera 1100 may also store the captured image and the extracted building information together. More specifically, the camera 1100 may store the captured image along with the extracted building information being displayed.

The camera 1100 may also store the captured image and the extracted building information separately. In this case, the camera 1100 may record a tag regarding a building information file on the captured image. Therefore, the camera 1100 reads out the building information file with reference to the tag when displaying the captured image afterward, so that the building information can be displayed along with the captured image.

As such, the camera 1100 is able to store the captured image and the building information together with each other and display the building information when displaying the captured image.

In the above-described embodiments of the present invention, the object to be extracted is a building. However, this is merely an example. Any object that can be extracted can be applied. That is, any object that can be extracted by the camera 1100 according to augmented reality technologies can be applied. For example, the present disclosure can be applied to a historic site, a park, or a bridge besides the building.

The mobile device is the camera 1100 in the above-described embodiments, merely as an example. Any device can be applied that can capture an image and detect location information. For example, the mobile device 200 may be a mobile phone, an MP3 player, a PDA, and a laptop computer.

Although a few embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:
1. A mobile device, comprising:
an image pickup unit configured to capture a specific location;
a display unit configured to display a captured image of the specific location including at least one object on a screen;
a location detection unit configured to detect a location of the mobile device and a direction for the mobile device to face;
a distance detection unit configured to detect a distance between the mobile device and the at least one object;
an image processing unit configured to recognize a boundary between each of the at least one object, and recognize a shape of the boundary of the at least one object to identify the at least one object; and
a control unit configured to acquire information related to the at least one object based on map information corresponding to the location of the mobile device, the direction for the mobile device to currently face, and the detected distance, and display the acquired information on the at least one object of the captured image.

2. The mobile device as claimed in claim 1, further comprising:
a communication unit configured to perform communication with respect to a server; and
a signal processing unit configured to process a signal exchanged through the communication unit,
wherein the image processing unit is further configured to display the image based on the signal processed by the signal processing unit.

3. The mobile device as claimed in claim 2, wherein the acquired information is indicated by at least one format of video, audio, and text formats.

4. The mobile device as claimed in claim 2, wherein the control unit is further configured to acquire information related to the at least one object through at least one of a camera, a recorder, a compass sensor, an acceleration sensor, and a gyro sensor.

5. The mobile device as claimed in claim 2, wherein the control unit is further configured to control the communication unit to transmit the acquired information to a surrounding device.

6. The mobile device as claimed in claim 1, wherein the control unit is further configured to acquire information related to at least one building included in the captured image referring to map information corresponding to the detected location of the mobile device, and display the acquired information to be superimposed onto the at least one building included in the captured live view image based on the determined distance and direction.

7. A mobile device, comprising:
an image pickup unit configured to capture a specific location;
a display unit configured to display a captured live view image of the specific location including at least one object on a screen;
a location detection unit configured to detect a location of the mobile device and a direction which the mobile device faces;
an image processing unit configured to recognize a boundary between each of the at least one object, and recognize a shape of the boundary of the at least one object to identify the at least one object; and
a control unit configured to determine a distance to the at least one object from the mobile device, acquire information related to the at least one object based on map information corresponding to the location and the direction of the mobile device and the distance to the at least one object, display the acquired information superimposed onto the at least one object of the captured live view image, and display contact information of the at least one object on the captured live view image, when receiving a user input for the at least one object.

8. The mobile device as claimed in claim 7, wherein the control unit is further configured to display a building name to be superimposed onto the at least one building of the captured live view image based on the detected location and direction, and display contact information of the at least one building on the captured live view image, when receiving a user touch input on the at least one building.

9. The mobile device as claimed in claim 8, wherein the control unit is further configured to control to transmit a telephone-call signal to a building, when a user input for making a call for displayed contact information is received.

10. The mobile device as claimed in claim 8, wherein the control unit is further configured to control to transmit a request for making a call for displayed contact information to an external device.

11. A mobile device, comprising:
an image pickup unit configured to capture a specific location;
a display unit configured to display a captured live view image of the specific location including at least one object on a screen;
a location detection unit configured to detect a location of the mobile device and a direction of the at least one object;
an image processing unit configured to recognize a boundary between each of the at least one object, and recognize a shape of the boundary of the at least one object to identify the at least one object; and
a control unit configured to acquire information related to the at least one object based on the location and the direction of the mobile device, and display the acquired information superimposed onto the at least one object of the captured live view image based on the detected location, direction, and a category of interest set by a user,
wherein the control unit is further configured to display the acquired information related to a first object in a manner distinguished from the acquired information related to a second object, when a user input related to the first object is received.

* * * * *